United States Patent
Gara et al.

(10) Patent No.: US 11,132,629 B2
(45) Date of Patent: Sep. 28, 2021

(54) CROWDSOURCED ROADSIDE ASSISTANCE SERVICE PROVIDER ASSIGNMENT SYSTEM

(71) Applicant: Allstate Insurance Company, Northbrook, IL (US)

(72) Inventors: Jonathan Gara, Northbrook, IL (US); Robert H. Johnson, Hoffman Estates, IL (US); Jennifer A. Brandmaier, Chicago, IL (US); Jason Balabas, Arlington Heights, IL (US); Tao Chen, Northbrook, IL (US); Christopher J. Lieggi, Schaumburg, IL (US); Robert A. Spinneweber, Tempe, AZ (US)

(73) Assignee: Allstate Insurance Company, Northbrook, IL (US)

( * ) Notice: Subject to any disclaimer, the term of this patent is extended or adjusted under 35 U.S.C. 154(b) by 279 days.

(21) Appl. No.: 16/133,962

(22) Filed: Sep. 18, 2018

(65) Prior Publication Data

US 2019/0392367 A1    Dec. 26, 2019

Related U.S. Application Data

(63) Continuation-in-part of application No. 15/674,197, filed on Aug. 10, 2017, now Pat. No. 10,255,570, (Continued)

(51) Int. Cl.
*G06Q 10/00* (2012.01)
*G06Q 10/06* (2012.01)
(Continued)

(52) U.S. Cl.
CPC .. *G06Q 10/063112* (2013.01); *B60R 16/0234* (2013.01); *G06Q 10/06* (2013.01);
(Continued)

(58) Field of Classification Search
CPC .......... G06Q 10/06; G06Q 10/063114; G06Q 10/06311; G06Q 10/0631;
(Continued)

(56) References Cited

U.S. PATENT DOCUMENTS

| 7,774,223 B2 | 8/2010 | Karabetsos |
| 7,809,367 B2 | 10/2010 | Hellaker |

(Continued)

FOREIGN PATENT DOCUMENTS

| KR | 20090124779 A | 12/2009 |
| WO | 2018017075 A1 | 1/2018 |

OTHER PUBLICATIONS

Jan. 15, 2020—U.S. Notice of Allowance—U.S. Appl. No. 16/294,246.
(Continued)

*Primary Examiner* — William S Brockington, III
(74) *Attorney, Agent, or Firm* — Dinsmore & Shohl LLP

(57) ABSTRACT

Aspects of the disclosure provide a computer-implemented method and system for the assignment of crowdsourced roadside assistance service providers to distressed vehicles/drivers requiring roadside assistance. The methods and systems may include a roadside assistance service provider system with a collection module, an assignment module, and a feedback module. The collection module collects roadside assistance service provider information and historical statistics from real-world information and stores the information in a database that may then be analyzed using particular rules and formulas. The assignment module assigns particular roadside assistance service providers to particular distressed vehicles/drivers based on one or more characteristics. The feedback module may provide near real-time cues to the roadside assistance service provider's mobile device, such as alerting when the amount of time spent on a task
(Continued)

exceeds a predefined threshold, flagging high priority tasks/assignments, providing a technical reference for the repair.

24 Claims, 11 Drawing Sheets

Related U.S. Application Data which is a continuation of application No. 15/382,093, filed on Dec. 16, 2016, now Pat. No. 9,760,846, which is a continuation of application No. 15/010,545, filed on Jan. 29, 2016, now Pat. No. 9,672,520, which is a continuation of application No. 14/798,138, filed on Jul. 13, 2015, now Pat. No. 9,282,430.

(60) Provisional application No. 62/030,966, filed on Jul. 30, 2014.

(51) Int. Cl.
| | |
|---|---|
| *H04W 4/44* | (2018.01) |
| *G07C 5/00* | (2006.01) |
| *G06Q 30/06* | (2012.01) |
| *G06Q 20/12* | (2012.01) |
| *B60R 16/023* | (2006.01) |
| *G06Q 30/00* | (2012.01) |
| *H04W 4/90* | (2018.01) |
| *H04W 4/02* | (2018.01) |

(52) U.S. Cl.
CPC ..... *G06Q 10/063114* (2013.01); *G06Q 20/12* (2013.01); *G06Q 30/016* (2013.01); *G06Q 30/0635* (2013.01); *G07C 5/006* (2013.01); *G07C 5/008* (2013.01); *H04W 4/02* (2013.01); *H04W 4/44* (2018.02); *H04W 4/90* (2018.02)

(58) Field of Classification Search
CPC ......... G06Q 10/063112; G06Q 10/063; G06Q 30/018; G06Q 30/0635; G06Q 30/016; G06Q 50/30; G06Q 20/12; G07C 5/006; G07C 5/008; H04W 4/02; H04W 4/44; H04W 4/90; B60R 16/0234

See application file for complete search history.

(56) References Cited

U.S. PATENT DOCUMENTS

| | | | |
|---|---|---|---|
| 9,282,430 B1* | 3/2016 | Brandmaier | G06Q 10/06 |
| 9,749,812 B1 | 8/2017 | Dulee et al. | |
| 9,760,846 B1 | 9/2017 | Brandmaier et al. | |
| 9,940,596 B1 | 4/2018 | Briggs et al. | |
| 2003/0167112 A1 | 9/2003 | Akiyama | |
| 2004/0162844 A1* | 8/2004 | Thome | G06Q 10/08 |
| 2004/0192348 A1 | 9/2004 | Gudmundsson et al. | |
| 2007/0226374 A1 | 9/2007 | Quarterman et al. | |
| 2008/0172381 A1 | 7/2008 | Suh | |
| 2009/0161644 A1 | 6/2009 | Suzuki et al. | |
| 2009/0233572 A1 | 9/2009 | Basir | |
| 2009/0275311 A1 | 11/2009 | Gilmartin et al. | |
| 2009/0299805 A1 | 12/2009 | Baughman et al. | |
| 2009/0309758 A1 | 12/2009 | Gueziec | |
| 2010/0049618 A1 | 2/2010 | Smith | |
| 2010/0115093 A1 | 5/2010 | Rice | |
| 2012/0066010 A1 | 3/2012 | Williams et al. | |
| 2012/0146809 A1 | 6/2012 | Oh et al. | |
| 2012/0190384 A1 | 7/2012 | Marr et al. | |
| 2013/0024316 A1 | 1/2013 | Cooke | |
| 2013/0225111 A1 | 8/2013 | Hatton et al. | |
| 2015/0172894 A1 | 6/2015 | Gabel | |
| 2015/0324720 A1 | 11/2015 | Briggs et al. | |
| 2015/0358794 A1 | 12/2015 | Nokhoudian et al. | |
| 2016/0019728 A1* | 1/2016 | Petrie | G06Q 50/30 705/5 |
| 2016/0042303 A1* | 2/2016 | Medina | H04W 4/024 705/5 |
| 2016/0092962 A1 | 3/2016 | Wasserman et al. | |
| 2016/0225115 A1* | 8/2016 | Levy | G06Q 50/30 |
| 2017/0103490 A1* | 4/2017 | Haparnas | G06Q 50/30 |
| 2018/0181904 A1* | 6/2018 | Wilkinson | G06Q 10/083 |

OTHER PUBLICATIONS

Geico Roadside Assistance With Emergency Roadside Service, [On-line] downloaded Dec. 18, 2014 http://www.geico.com/getaquote/auto/emergency-road-service/.

Roadside Services Guide, Auto—CAA South Central Ontario [On-line} downloaded Dec. 18, 2014 http://www.caasco.com/Auto/Roadside-Services/Roadside-Services-Guide.

Lapadula, Alessandro, et al. "COWS Specification of the On Road Assistance Scenario", Dec. 19, 2007.

Sensoria D1.4a: UML for Service-Oriented Systems, Oct. 10, 2007, pp. 1-21.

Fletcher Jones Motorcars, Mercedes-Benz Roadside Assistance [On-line] downloaded Dec. 18, 2104 http://www.fjmercedes.com/mercedes-benz-roadside-assistance.htm.

J&S Towing, We will change your car Tire anytime and anywhere in Broward County, [On-line] downloaded Dec. 18, 2014, http://www.jandstowingandtransport.com/tire-changes.html.

Welcome AAA Affiliates, International Relations, [On-line] downloaded Dec. 18, 2014, http://www.aaa.com/PPInternational/Benefits_Intl_to_US.html.

Jensen, M. and Wagner, J., "Analysis of in-vehicle driver behaviour data for improved safety", Int. J. Vehicle Safety, vol. 5, No. 3, 2011, pp. 1-16.

M. Jensen, J. Wagner and K. Alexander, Analysis of in-vehicle driver behaviour data for improved safety, Int. J. Vehicle Safety, vol. 5, No. 3, 2011, pp. 197-212.

Apr. 19, 2018—U.S. Non-Final Office Action—U.S. Appl. No. 15/674,197.

Nov. 26, 2019—(WO) International Search Report & Written Opinion—Application No. PCT/US19/51264.

May 21, 2019—U.S. Non-Final Office Action—U.S. Appl. No. 14/798,102.

Oct. 7, 2020—U.S. Notice of Allowance—U.S. Appl. No. 16/844,009.

* cited by examiner

CROWDSOURCED ROADSIDE ASSISTANCE SERVICE PROVIDER ASSIGNMENT SYSTEM

This application is a continuation-in-part of U.S. application Ser. No. 15/674,197, filed Aug. 10, 2017; which is a continuation of U.S. application Ser. No. 15/382,093, filed Dec. 16, 2016 and issued as U.S. Pat. No. 9,760,846 on Sep. 12, 2017; which is a continuation of U.S. application Ser. No. 15/010,545, filed Jan. 29, 2016 and issued as U.S. Pat. No. 9,672,520 on Jun. 6, 2017; which is a continuation of U.S. application Ser. No. 14/798,138, filed Jul. 13, 2015 and issued as U.S. Pat. No. 9,282,430 on Mar. 8, 2016; which claims priority to Provisional Application, U.S. Ser. No. 62/030,966, filed Jul. 30, 2014, which is incorporated herein by reference in its entirety.

FIELD OF THE INVENTION

The disclosure relates generally to methods and systems for crowdsourced mobile or online roadside assistance service providers. More specifically, the disclosure provides computer-implemented methods and systems that relates to the assignment of a roadside assistance service provider to distressed vehicles/drivers requiring roadside assistance.

BACKGROUND

Services provided to users, such as roadside assistance services, automobile services, home services, and other personal services, are traditionally serviced through professional service providers that can be expensive and difficult to schedule. Specifically, roadside assistance service providers provide towing services, flat tire assistance, fuel services, automobile repairs, oil changes, and scheduled maintenance appointments, etc. Most prior art systems might auto assign roadside assistance service providers or tow truck drivers solely based on the proximity to a distressed vehicle. Telematics devices are known and used in the art to provide various telematics information to users and/or service providers regarding their location, direction of travel, velocity, route, and/or destination. Additionally, there is a vast wealth of insurance information that includes locations and instances for previous accidents, previous insurance claims, and driving history.

Accordingly, it would be desirable to provide roadside assistance service provider systems and methods for safe and effective service requests and assigning using a system that takes a sophisticated approach to collecting various types of data through sensors and systems, analyzes that data, and assigns roadside assistance service providers based on a complex plurality of factors/characteristics for a more optimized assignment. It would be desirable to include telematics information and service provider information to locate the service providers based on the location of the services requested and to prioritize the service providers based on the user preferences, telematics information, additional factors, and insurance information of the service providers

BRIEF SUMMARY

The following presents a simplified summary of the invention in order to provide a basic understanding of some aspects of the disclosure. This summary is not an extensive overview of the invention. It is not intended to identify key or critical elements of the invention or to delineate the scope of the invention. The following summary merely presents some concepts of the invention in a simplified form as a prelude to the more detailed description provided below.

A first aspect of the disclosure provides a roadside assistance system that includes: a roadside assistance service provider server having at least one processor; a roadside assistance service provider application for use on a mobile device and executing on the roadside assistance service provider server; a plurality of sensors positioned on a vehicle of a roadside assistance service provider, and a telematics device in communication with a distressed vehicle and in communication with the roadside assistance service provider application. The plurality of sensors may collect roadside assistance service provider information for a roadside assistance service provider. The roadside assistance service provider may be a selected service provider from a crowdsourced group of individuals who are service providers, have registered with the roadside assistance system, and have been validated and/or verified to provide roadside assistance services including one or more of the following services: jump start, flat tire change, fuel the distressed vehicle, tow the distressed vehicle, or unlock a locked-out vehicle. The telematics device may provide telematics information to the roadside assistance service provider application and the roadside assistance service provider server. The roadside assistance service provider application upon execution of computer-executable instructions from the roadside assistance service provider server is configured to perform the following steps: receive, by the roadside assistance service provider server, a roadside assistance service request from a driver of the distressed vehicle, wherein the roadside assistance service request includes one or more of the following: jump start the distressed vehicle, flat tire change, fuel the distressed vehicle, tow the distressed vehicle, or unlock a locked out distressed vehicle; determine, by the roadside assistance service provider server, the selected service provider based on a proximity in location between the distressed vehicle and the selected service provider; send, by the roadside assistance service provider server to the roadside assistance service provider application, the roadside assistance service request to the selected service provider; receive, through the roadside assistance service provider application, acceptance of the roadside assistance service request from the selected service provider; provide, by the roadside assistance service provider server and the telematics device and plurality of sensors, event notifications to the roadside assistance service provider application of a status of the selected service provider with respect to the roadside assistance service request, wherein the event notifications are near real-time cues to the roadside assistance service provider via the mobile device; and receive, through the roadside assistance service provider application, confirmation of completion of the roadside assistance service request from the selected service provider.

Another aspect of the disclosure provides one or more non-transitory computer readable media storing computer readable instructions that, when executed, may cause an apparatus to: (a) receive, through a roadside assistance service provider application for use on a mobile device executing on a roadside assistance service provider server having at least one processor, a roadside assistance service request from a driver of a distressed vehicle; (b) collect roadside assistance service provider information by a plurality of sensors in communication with a vehicle of a roadside assistance service provider, wherein the roadside assistance service provider is a selected service provider from a crowdsourced group of individuals who are service providers, have registered with the roadside assistance service provider server, and have been trained to provide roadside assistance service including one or more of the following services: jump start, flat tire change, fuel the distressed vehicle, tow the distressed vehicle, or unlock a locked-out vehicle; (c) receive, by the roadside assistance service provider server, telematics information from a telematics device wirelessly connected to the distressed vehicle; (d) receive, by the roadside assistance service provider server, a roadside assistance service request from the driver of the distressed vehicle, wherein the roadside assistance service request includes one or more of the following: jump start the distressed vehicle, flat tire change, fuel a lack of fuel vehicle, tow the distressed vehicle, or unlock a locked out vehicle; (e) determine, by the roadside assistance service provider server, the selected service provider based on a set of factors that include: proximity in location between the distressed vehicle and the selected service provider, prior driver's ratings for the selected service provider, a skill set of the selected service provider, and a cost of the selected service provider; (f) send, by the roadside assistance service provider server to the roadside assistance service provider application, the roadside assistance service request to the selected service provider; (g) receive, through the roadside assistance service provider application, acceptance of the roadside assistance service request from the selected service provider; (h) provide, by the roadside assistance service provider server and the telematics device and plurality of sensors, event notifications to the roadside assistance service provider application of a status of the selected service provider with respect to the roadside assistance service request; and (i) receive, through the roadside assistance service provider application, confirmation of completion of the roadside assistance service request from the selected service provider.

In another aspect of the disclosure, a roadside assistance system may comprise: a roadside assistance service provider server having at least one processor; a roadside assistance service provider application for use on a mobile device and executing on the roadside assistance service provider server; a plurality of sensors positioned on a vehicle of a roadside assistance service provider, and a telematics device in communication with a distressed vehicle and in communication with the roadside assistance service provider application. The plurality of sensors may collect roadside assistance service provider information. The roadside assistance service provider may be selected service provider from a crowdsourced group of individuals who are service providers, have registered with the roadside assistance system, and have been trained to provide roadside assistance services including the following services: jump start, flat tire change, fuel the distressed vehicle, tow the distressed vehicle, and unlock a locked-out vehicle. The telematics device provides telematics information to the roadside assistance service provider application and the roadside assistance service provider server. The roadside assistance service provider application, upon execution of computer-executable instructions from the roadside assistance service provider server, may be configured to: receive, by the roadside assistance service provider server, a registration from the crowdsourced group of individuals who are service providers, wherein the registration includes background checks and a driver's record check, wherein the registration further includes validation of completed training for the crowdsourced group of individuals who are service providers; receive, by the roadside assistance service provider server, a roadside assistance service request from the driver of the distressed vehicle, wherein the roadside assistance service request includes one or more of the following: jump start the distressed vehicle, flat tire change, fuel a lack of fuel vehicle, tow the distressed vehicle, or unlock a locked out vehicle; determine, by the roadside assistance service provider server, the selected service provider based on one or more factors, wherein the one or more factors include one or more of the following: proximity in location between the distressed vehicle and the selected service provider, prior driver's ratings for the selected service provider, a skill set of the selected service provider, or a cost of the selected service provider; send, by the roadside assistance service provider server to the roadside assistance service provider application, the roadside assistance service request to the selected service provider; receive, through the roadside assistance service provider application, acceptance of the roadside assistance service request from the selected service provider; and receive, through the roadside assistance service provider application, confirmation of completion of the roadside assistance service request from the selected service provider.

The details of these and other embodiments of the present disclosure are set forth in the accompanying drawings and the description below. Other features and advantages of the disclosure will be apparent form the description and drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
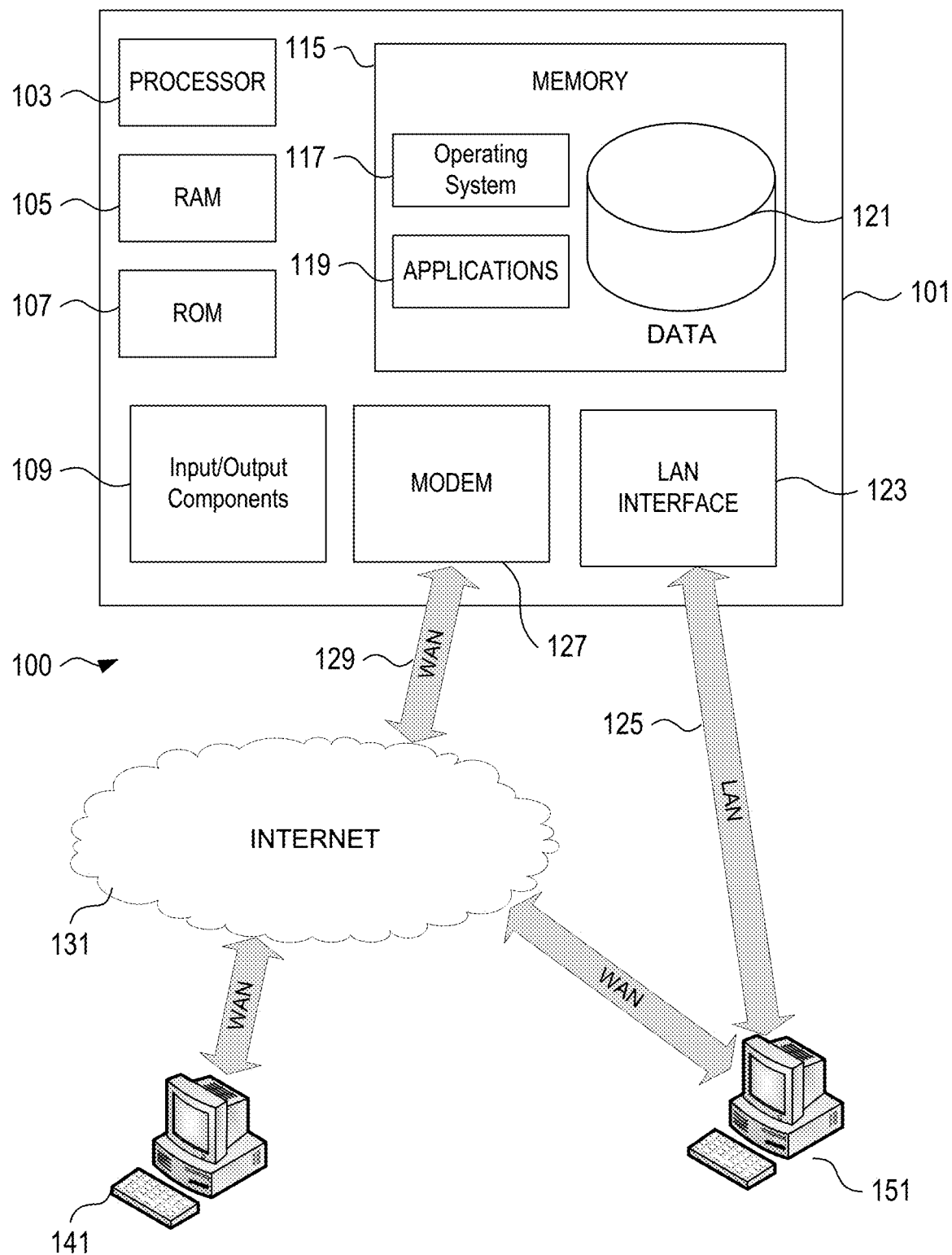
FIG. 1 is an illustrative network environment and computing systems that may be used to implement aspects of the present disclosure.

In the following description of the various embodiments, reference is made to the accompanying drawings, which form a part hereof, and in which is shown by way of illustration various embodiments in which the subject matter of the disclosure may be practiced. It is to be understood that other embodiments may be utilized and structural and functional modifications may be made without departing from the scope of the present disclosure.

Aspects of the disclosure provide a computer-implemented method and system for individuals to be independent contractor service providers or service providers who are crowdsourced. The methods and systems may include the use of an application on a mobile device that provides telematics information, service provider information to locate the service providers; prioritizes the service providers based on the user preferences, telematics information, and service provider information; and facilitates the service provider request and the electronic payment for the services. A system may allow the individual to register as a service provider and include their skills and qualifications. The system may provide a performance rating and/or user comments for the service providers. When a user needs services, such as a tire repair, the system may notify the service providers that meet predetermined criteria and allows them to bid on the services. The system may then select a service provider or allows the user to select the service provider. The system can include roadside services, automobile services, home services, and personal services. Telematics information regarding the user and/or the vehicle may be utilized to provide information regarding the service provider's location, velocity (instantaneous and average), route, and destination. The computer-implemented method and system may utilize insurance information to provide additional features and to enhance the mobile service provider methods and systems by providing known and safe routes and recommendations to the user as described and detailed below.

Additional aspects of the disclosure may also provide a computer-implemented method and system for independent contractors, e.g. freelancers to provide services such as automobile repair, etc. to third parties (users). The computer-implemented method and system may allow individuals to register as service providers. The individuals may identify their qualifications, the types of services they can perform and their location. The computer-implemented method and system may determine a safety rating of the service provider based on various parameters such as a driving score, car insurance information, and payment history, etc. The computer-implemented method and system may determine a performance rating of the service provider based on various user ratings and comments. The computer-implemented method and system may be utilized on a computer, laptop, internet, or mobile devices. The computer-implemented method and system may also track the individual's location through telematics information so that when a user needs services, a list of potential service providers may be displayed to the user based on the user's location and other factors. The service providers may also be informed about the services required and the price through a push notification. The service providers may then also elect to provide the service at a set price.

Figure 6:
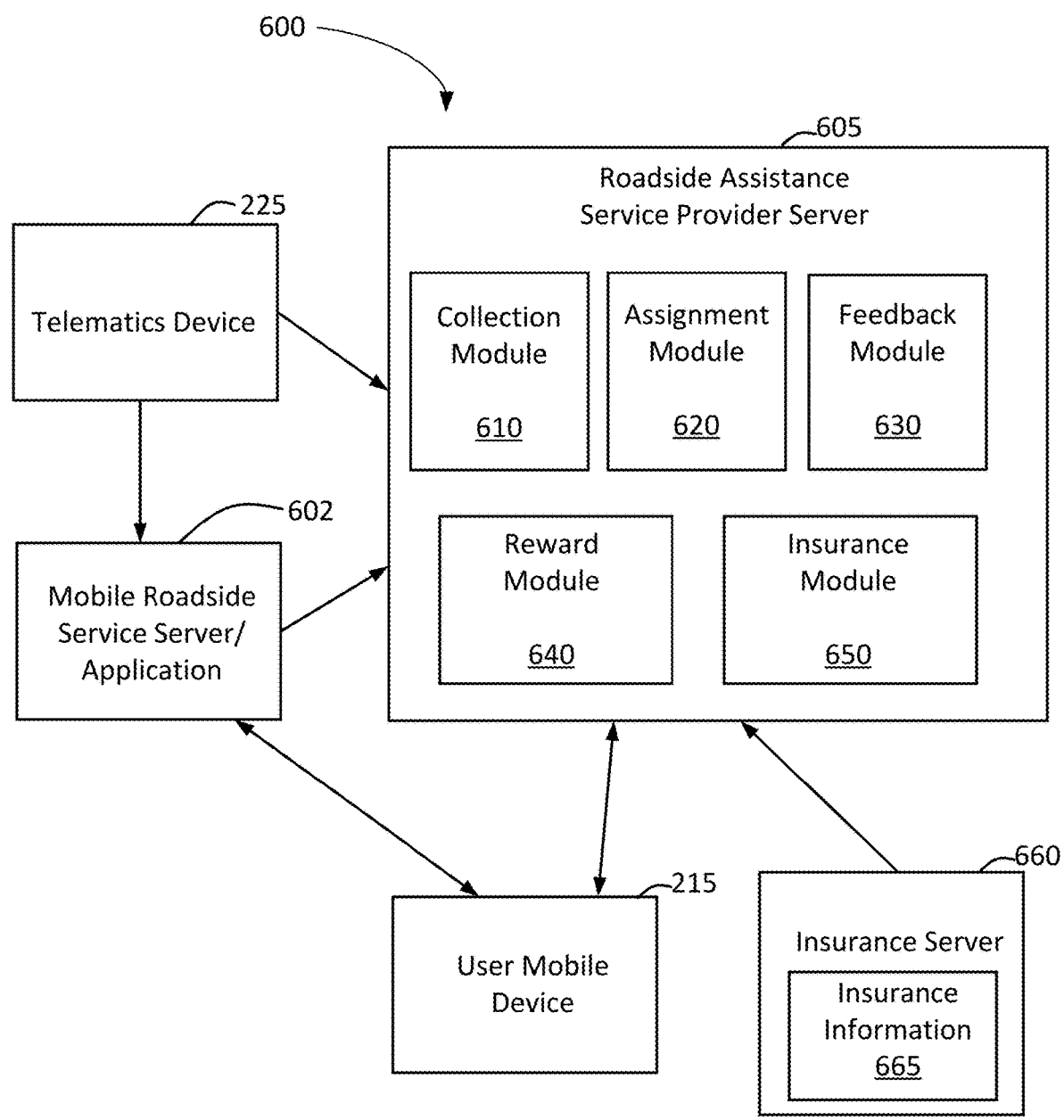
FIG. 6 illustrates an exemplary block diagram of a roadside assistance service provider system that may be used to implement various aspects of the disclosure.

FIG. 1 illustrates a block diagram of a mobile service provider server or a roadside assistance service provider server 101 (e.g., a computer server) in communication with a mobile service provider system 100 that may be used according to an illustrative embodiment of the disclosure. A roadside assistance service provider system 600 as illustrated in FIG. 6 may also be represented by reference number 100 in FIG. 1. The mobile service provider server or roadside assistance service provider server 101 may have a processor 103 for controlling overall operation of the a mobile service provider server or roadside assistance service provider server 101 and its associated components, including RAM 105, ROM 107, input/output component 109, and memory 115.

Input/Output (I/O) 109 may include a microphone, keypad, touch screen, and/or stylus through which a user of the mobile service provider server or roadside assistance service provider server 101 may provide input, and may also include one or more of a speaker for providing audio output and a video display device for providing textual, audiovisual and/or graphical output. Additionally, a hands-free or voice aspect may be utilized to provide input for the mobile service provider server or roadside assistance service provider server 101. Software may be stored within memory 115 and/or storage to provide instructions to processor 103 for enabling the mobile service provider server or roadside assistance service provider server 101 to perform various functions. For example, the memory 115 may store software used by the mobile service provider server or roadside assistance service provider server 101, such as an operating system 117, application programs 119, and an associated database 121. The processor 103 and its associated components may allow the mobile service provider server or roadside assistance service provider server 101 to run a series of computer-readable instructions to receive service requests from a user, receive telematics information, and analyze this information to provide a prioritized ranking of service providers to fulfill the service request. Additionally, the processor 103 and its associated components may allow the mobile service provider server or roadside assistance service provider server 101 to provide service provider information, and transmit a selected service provider to a user or service provider. Additionally, the processor 103 and its associated components may allow the mobile service provider server or roadside assistance service provider server 101 to run a series of computer-readable instructions to provide an electronic payment for the service provided, receive confirmation of the order, and provide rewards to the user. In addition, the processor 103 may receive insurance information in order to enhance and improve the service providing process. Further still, the processor 103 may derive insurance rating factors for insurance coverage and premiums based on the service provider, specific service request, and the frequency of the service requests.

The mobile service provider server or roadside assistance service provider server 101 may operate in a networked environment supporting connections to one or more remote computers, such as terminals 141 and 151. The terminals 141 and 151 may be personal computers or servers that include many or all of the elements described above relative to the mobile service provider server or roadside assistance service provider server 101. Alternatively, terminal 141 and/or 151 may be data stores for storing information related to service provider and user information or insurance information. The network connections depicted in FIG. 1 include a local area network (LAN) 125 and a wide area network (WAN) 129 but may also include other networks. When used in a LAN networking environment, the mobile service provider server or roadside assistance service provider server 101 is connected to the LAN 125 through a network interface or adapter 123. When used in a WAN networking environment, the mobile service provider server or roadside assistance service provider server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the mobile service provider server or roadside assistance service provider server 101 according to an illustrative embodiment of the disclosure may include computer executable instructions for invoking functionality related to mobile service provider and insurance systems. The application program 119 may be detailed further as the mobile service provider application 300. The mobile service provider server 101 and/or terminals 141 or 151 may also be mobile terminals including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, mobile devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program applications or modules, being executed by a computer. Generally, program applications or modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, the program applications or modules may be located in both local and remote computer storage media including memory storage devices.

Figure 2:
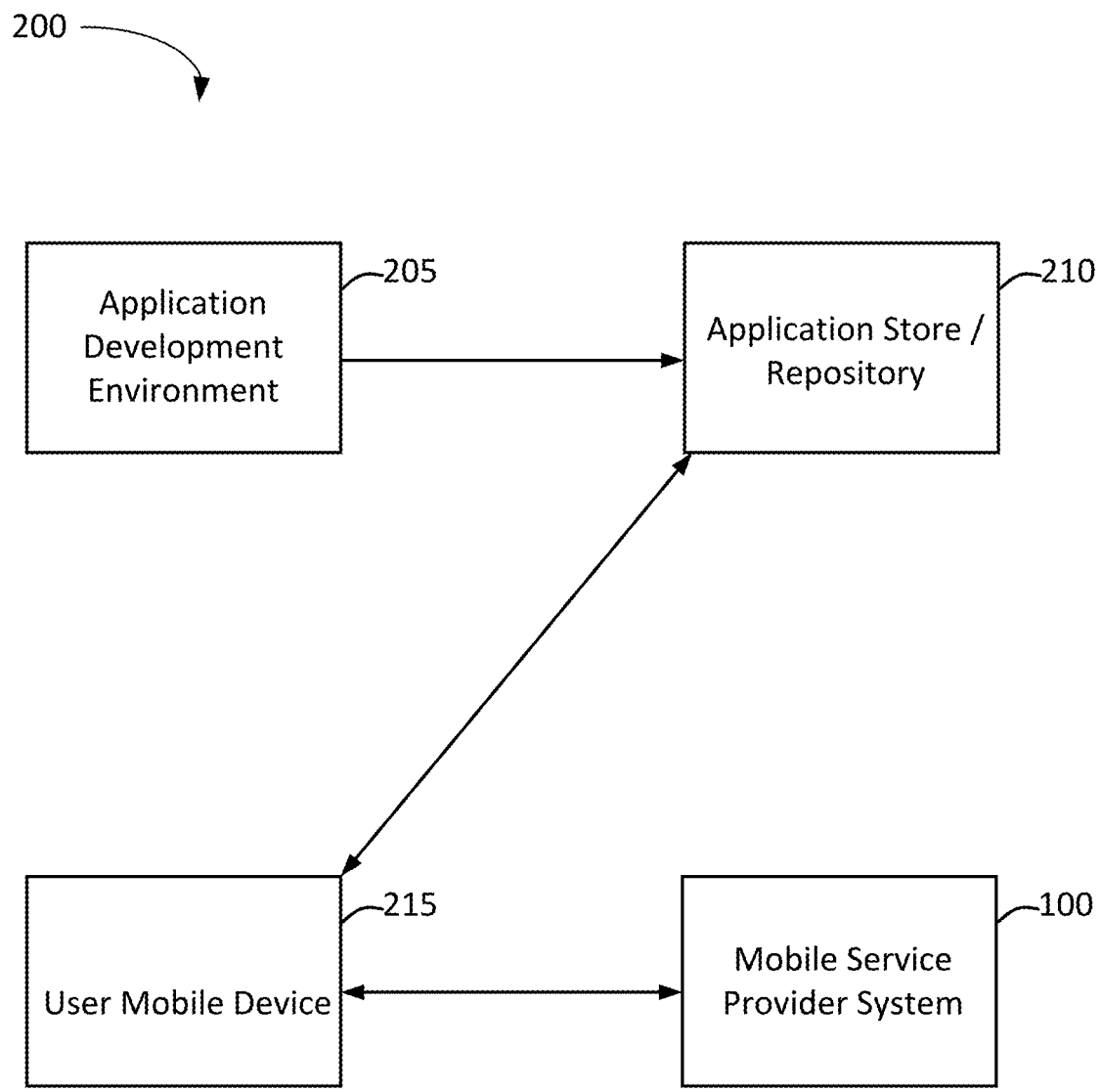
FIG. 2 is an illustrative example operating environment that may be used to implement the processes and functions of certain aspects of the present disclosure.

FIG. 2 illustrates an example system including various components for facilitating a mobile service provider application and mobile service provider process. The application system 200 may include an application development environment 205, an application store or repository 210, a user mobile device 215, and a mobile service provider system 100. The application development environment 205 may be operated by an insurance provider such as an insurance company. Application development environment 205 may include a hardware environment or a software environment. For example, the application development environment 205 may be provided on a server. Alternatively or additionally, the application development environment 205 may be provided as a software environment in which applications may be constructed and tested. The application development environment 205 may further be used to validate the integrity of applications before deployment through one or more distribution channels such as application store/repository 210. Validating the integrity of an application may include executing the application against multiple data sets to insure correct operation, verifying security and privacy protections, verifying that the application adheres to one or more requirements or regulations (e.g., industry requirements, government regulations, privacy guidelines/requirements) and the like and/or combinations thereof.

Once the application has been published to the application store/repository 210, the application may be made available to a general public, subscribers to the application store/repository 210, or users of a particular operating system, service or other environment. Example application stores or repositories may include the APPLE App Store, the Android Market, the Microsoft Store, the Blackberry App World, and/or any other similar application stores or repositories. The application may be downloaded to one or more devices through the application store/repository 210. In some arrangements, downloading of the applications may be restricted to particular operating systems, hardware devices, device capabilities, software requirements and the like and/or combinations thereof.

The user mobile device 215 may be configured to execute applications provided through the application store/repository 210. For example, user mobile device 215 may execute a mobile service provider application 300 to help a user provide a service request safely and quickly from their vehicle. User mobile device 215 and the application executing thereon may communicate with a mobile service provider system 100. The mobile device 215 may include a built-in accelerometer and/or a Global Positioning System (GPS). The GPS on the mobile device 215 may acquire GPS information with respect to the user or a service provider. The GPS information may include, but not be limited to: location, instantaneous velocity, average velocity, route, destination, etc.

Application development environment 205, application store or repository 210 and mobile service provider system 100 may correspond to a single device, system, server, or location. In other arrangements, the application development environment 205, application store or repository 210 and mobile service provider system 100 may be provided as a distributed system among multiple locations and/or devices. The user mobile device 215 may be located remotely from one or more of application development environment 205, application store/repository 210 and/or mobile service provider system 100. The various devices and systems 205, 210, 215 and 100 of the application system 200 may communicate with one another using various protocols and through various networks. For example, the user mobile device 215 may transmit and receive data through a cellular network or other types of wireless networks (e.g., Wi-Fi or Bluetooth or other known and used wireless methods known and used in the art). Alternatively or additionally, communications may be facilitated using a hand-free service with the user mobile device 215. Alternatively or additionally, communications may be facilitated using wired connections and protocols.

The present disclosure may utilize an in-vehicle device 225 to collect and provide telematics information as known and used in the art. The in-vehicle device 225 may include a processor with a display or graphical interface that receives and/or collects driving data and/or telematics information and provides additional information based on the driving data. The driving data, GPS information, and/or telematics information may include, but not be limited to: location, instantaneous velocity, average velocity, route, destination, etc. The in-vehicle device 225, which may be configured to receive real-time vehicle data, may provide a driver with visual and/or audible in-vehicle information. The in-vehicle device 225 may process real-time (i.e., near real-time) data and then display the processed information in a meaningful way on a display or graphical user interface (GUI). The in-vehicle device 225 may receive and/or collect critical driving data and store summary information for and/or about the driver.

The in-vehicle device 225 may communicate with a data collection device or on-board diagnostics port of a vehicle to collect the driving data. In another exemplary embodiment, the in-vehicle device 225 may acquire the driving data directly from the device, such as a smart phone, tablet computer, or vehicle navigation system via a built-in accelerometer and/or a Global Positioning System (GPS).

Figure 3A:
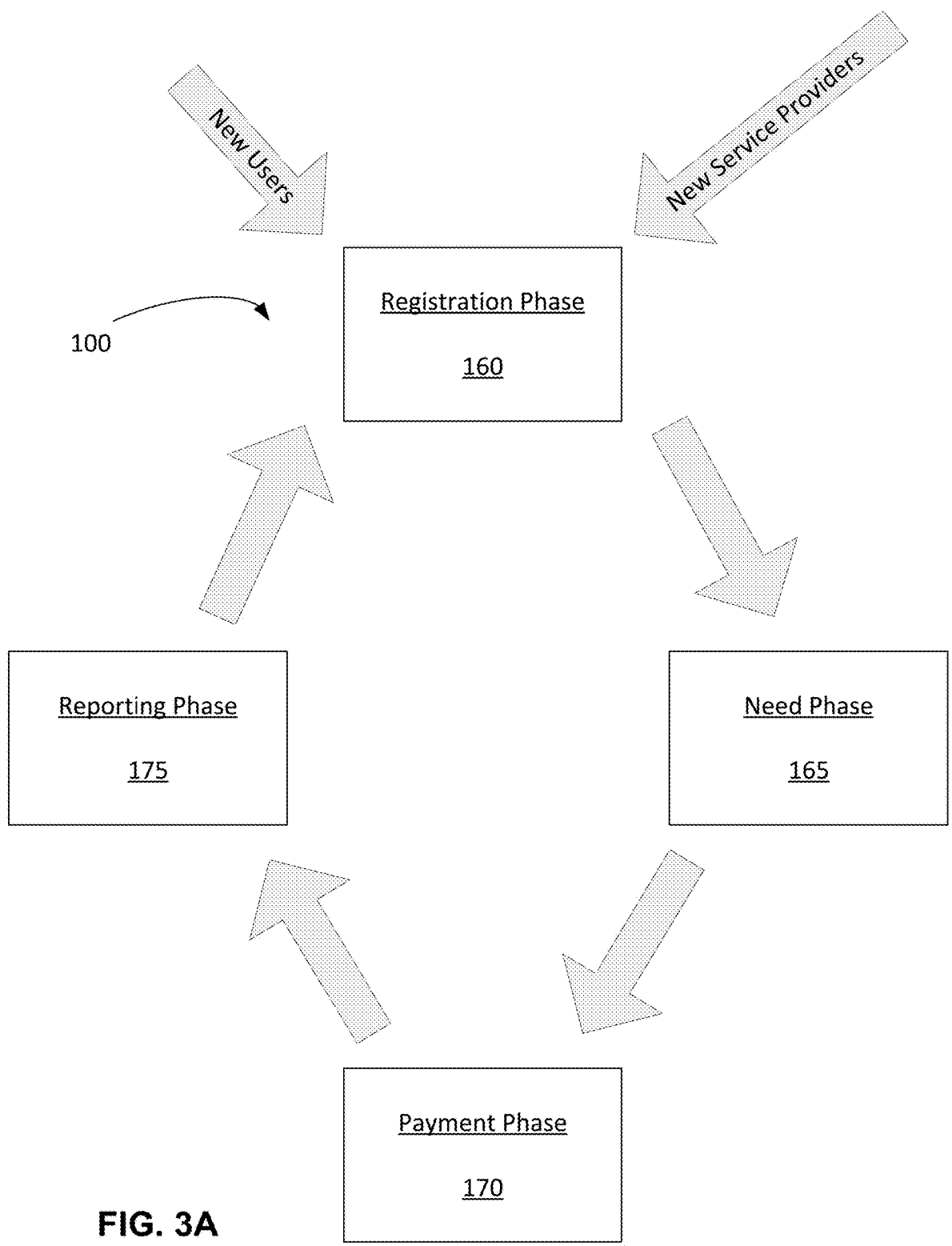
FIG. 3A illustrates an exemplary flow diagram of a mobile service provider system and application that may be used to implement various aspects of the disclosure.

FIG. 3A illustrates an exemplary flow diagram of a mobile service provider system 100 and application that may be used to implement various aspects of the disclosure. Generally, the mobile service provider system 100 may utilize different phases, such as a registration phase 160, a need phase 165, a payment phase 170, and a reporting phase 180. The mobile service provider system 100 may include each of the four different phases. The system is a continuous process as illustrated by the circular flow of from each of the four different phases.

During the registration phase, a mobile service provider application 300 may be available to a new user. The user may download this mobile service provider application 300 on to a mobile device. Alternatively, the user may utilize the mobile service provider application 300 via the internet on an internet form or a website. The potential user may then complete a user profile and enter their information, such as name, address, phone number, services potentially needed. The potential user may also be able to register using the insurance information which includes all of the pertinent and required information. After the user completes their user profile, the user may then be asked if the user wants to be a service provider also. The user profile and/or the service provider profile may then be saved to the mobile service provider system 100. During the registration phase, a potential service provider may also register. The potential service provider may be complete service provider profile and enter their information, such as name, address, phone number, services provided, and any other qualifications necessary or linked to the services. The potential service provider may also be able to register using the insurance information which includes all of the pertinent and required information. The potential service provider may then be qualified, validate, or verified. The service provider system 100 may qualify, validate, or verify the service provider using the insurance information as described and provided by the insurance server, such as safe driver information or current payment information. This qualification, validation, and/or verification may provide a pre-screening tool for the users to ensure a quality and safe service provider. The service provider profile may then be saved to the mobile service provider system 100. The user and/or the service provide may allow the system to know or track their locations at all times to help facilitate the matching of users and service providers. Additionally, the insurance information and/or telematics information may allow the mobile service provider system 100 to tie the location to the users and the service providers through the telematics device or mobile device.

During the need phase, a user may submit a service request in the mobile service provider system 100. The mobile service provider system 100 may then filter potential service providers based on the nature of the service request, location of service providers, and other criteria based on providers. The mobile service provider system 100 may then determine any possible business or user goals associated with the service request, such as customer happiness, lowest cost, and timeliness. Based on the business goals, the mobile service provider system 100 may then further filter the potential service providers. The mobile service provider system 100 may detect whether a person who has accepted the service request will fulfill the service request. Based on this acceptance or non-acceptance, the mobile service provider system 100 may then resubmit the service request and/or cancel the previous service request. The mobile service provider system 100 may then provide the user with information about the service provider, such as credit risk, insurance information, driving score, premium risk, evaluation information, telematics information. The mobile service provider system 100 may also provide the user with information regarding the status of the services, i.e. service confirmation, start time, service provider en-route, service provider onsite, service completed, and/or service canceled.

During the payment phase, the user may provide the payment for the services rendered. The mobile service provider system 100 may be configured to allow for and provide an electronic payment for the services rendered. The mobile service provider system 100 may be configured to allow for the electronic payment to be automatic with a pre-entered payment method, such as credit card information, bank information, PayPal, google wallet, etc. With the automatic electronic payment method, the mobile service provider system 100 will automatically send the payment information to the mobile service provider system 100 after an order has been placed. Additionally, the mobile service provider system 100 may be configured to allow for manual individual input of payment methods with each service provider. In the manual electronic payment method, a service request may not be complete until the user manually inputs payment information to pay for the services. Additionally, the mobile service provider system 100 may be configured to provide a yearly membership for the services, whereas the customer does not pay for each individual service request. Additionally, the service provider may receive a non-monetary benefit for providing the services.

During the reporting phase, the mobile service provider system 100 may provide reporting and tracking capabilities. The mobile service provider system 100 may provide both real-time dashboard reporting as well as historical reporting. The real-time dashboard may include a service provider view and a service view. The service provider view may include and show the following: how many active service providers at any given point in time, where the service providers are located, and/or what the service providers are doing. The service view may include and show the following: how many active service requests at any given point in time, what the current status of active service requests, was the service level agreement (SLA) met or not. The historical reporting may include reporting of the service requests, which may include monthly/daily totals, types of service requests, region-wise reporting, met SLA or not, etc. The historical reporting may also include the reporting of "upsell" numbers, such as the number of service requests, the service types, and the dollar amounts associated with those service requests.

Figure 3B:
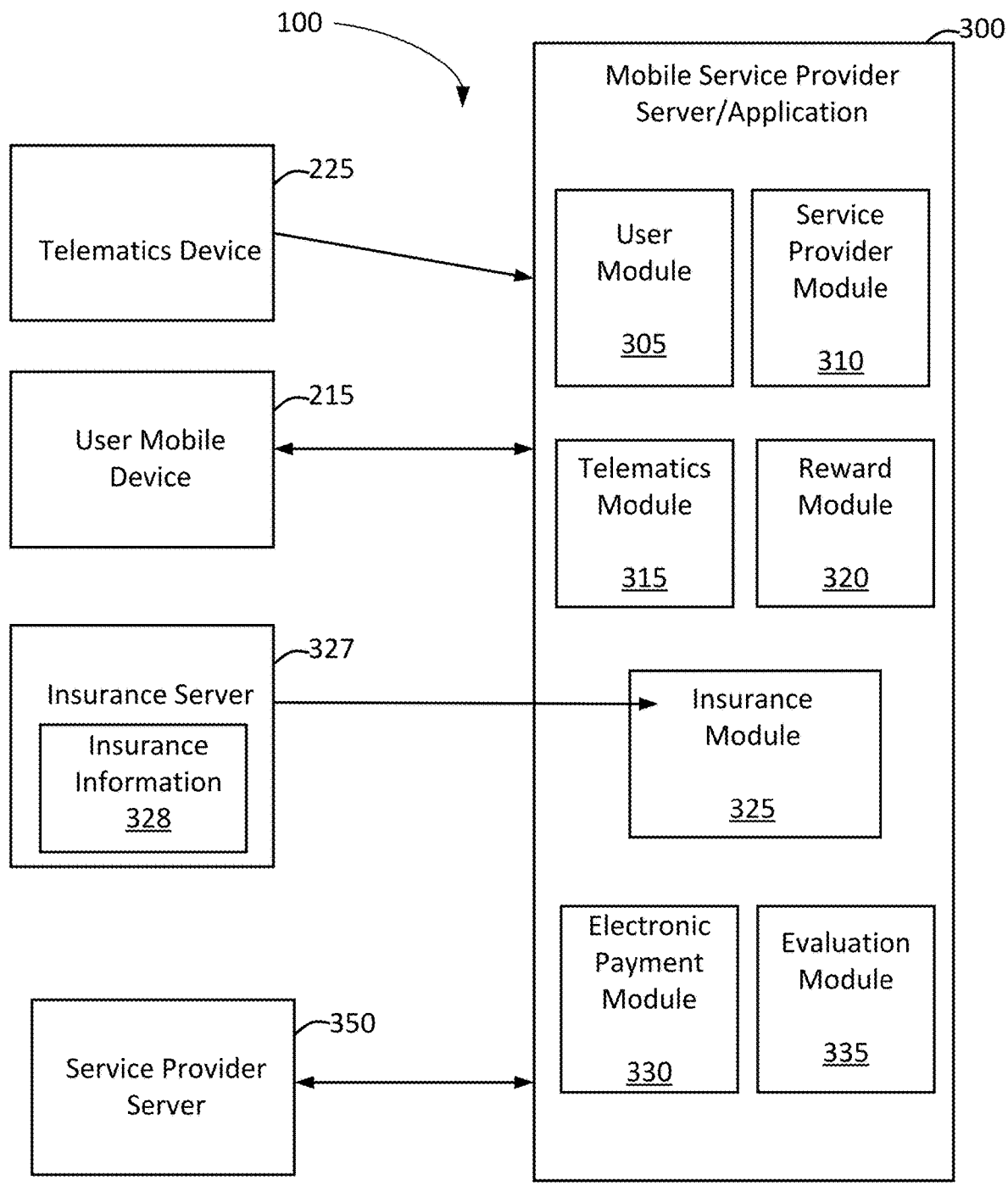
FIG. 3B illustrates an exemplary block diagram of a mobile service provider system and application that may be used to implement various aspects of the disclosure.

FIG. 3B is an example block diagram of a mobile service provider system 100 and mobile service provider application 300. The mobile service provider application 300 may include a variety of software or firmware modules such as one or more of the following: a user module 305, service provider module 310, a telematics module 315, a reward module 320, an insurance module 325, an electronic payment module 330, and an evaluation module 335. Each of these modules may be utilized by the mobile service provider application 300.

The user module 305 may be configured to do one or more of the following: provide registration services, request services, select service providers, view service provider information, and view service provider progress. The user module 305 may receive a registration by the user. The registration may be via an internet form, an iOS form, a social media platform (Facebook, twitter, google, etc.). The registration may be via conventional means such as through a targeted offer or mailing sent in an email or letter. The user module 305 may allow and facilitate the user requesting services. The requested services may include but not be limited to one or more of the following: jump start automobile, flat tire change, tow automobile, locked out of car, etc. Additionally, the user module 305 may allow and provide the user to pick a service provide from the provider list received from the service provider server 350. The user module 305 may facilitate and allow the user to view the service provider's specific information. The service provider's specific information may include contact details and estimated time of arrival. The service provider's specific information may also include insurance information and verification data regarding the specific service provider. The user module 305 may also facilitate and allow the user to monitor the service provider's real-time location movement via mapping services and/or the telematics information from the telematics module 315. The user module 305 may also facilitate and allow the user to monitor the service provider's progress of completing the service.

The service provider module 310 may be configured to do one or more of the following: view service request, bid service request, provide confirmation for the service request, and send event notifications (service start, en route, onsite, service complete, canceled service). The service provider module 310 may allow and provide the service provider to view and bid on a service request. The service provider module 310 may also allow and provide the service provider the ability to send event notifications for various service events. For example, the service provider module 310 may send an event notification confirming the service request. The service provider module 310 may also send an event notification for the start and completion of the service request. The service provider module 310 may also send an event notification for other events such as the service provider is en route, the service provider is onsite, or the service provider has canceled the service request.

Additionally, the service provider module 310 may be configured to interface with one or more service provider systems. The service provider module 310 may be configured to provide details of a given service provider, such as location, services provided, service provider ratings, service provider reviews, etc. Additionally, the service provider module 310 may be configured to provide real-time information about a given service provider, such as wait time, service time, service availability, etc. The service provider module 310 may be in communication with the service provider server 350, specifically for the real-time service provider information. Accordingly, a user may be able to receive immediate information about a given service provider through the service provider module 310 of the mobile service provider application 300. Additionally, the service provider module 310 may be configured to provide a qualification, validation, or verification of a given service provider. For example, the service provider module 310 may qualify, validate, or verify the service provider using the insurance information 328 as described and provided by the insurance server 327, such as safe driver information or current payment information. This qualification, validation, and/or verification may provide a pre-screening tool for the users to ensure a quality and safe service provider.

The telematics module 315 may be configured to receive, evaluate, and analyze a user's telematics information, such as location, velocity, direction of travel, route, and destination. The telematics module 315 may further be configured to recommend or provide a ranked list of service providers based on various factors, such as preferred service providers, safest route, fastest route, highest rated service providers, verified service providers, etc. The telematics module 315 may be in communication with the telematics device or in-vehicle device 225, wherein the telematics device 225 sends the telematics information to the telematics module 315. The telematics module 315 may further calculate and provide information regarding distance from nearest service provider to location of the service, time to travel (with or without traffic) from the service provider to location of the service, route information for selected service providers, etc. Additionally, for example, through various driving telematics information devices may provide or know the driving pattern of a user or a service provider. The telematics module 315 may know that the service provider may be driving by the user (service requestor) on their way home from work or through one of their known routes. The telematics module 315 may know and track the routes of the service providers based on the telematics information and the insurance information. The service provider request may be provided based on the known routes of the service provider.

The reward module 320 may be configured to provide a reward depending on the service provider selected by the user and the service utilized by the user. If the user chooses a verified service provider, the reward module 320 and the mobile service provider application 300 may provide a reward, such as cash back, discounts on services, and/or bonus service items. Additionally, the reward module may provide insurance rewards to the user depending on the service provider selected by the user and/or the service provided to the user. The reward module 320 may also provide insurance rewards based on the user's decision to follow the recommendations of the system. The insurance rewards may include discounts on future premiums, increased insurance coverage, and/or decreased deductible.

Additionally, an insurance module 325 may be included with the mobile service provider application 300. The insurance module 325 may include insurance information 328 that may reside on an insurance server 327 regarding information about a particular user, previous accidents, previous claims, information about other users with similar characteristics, etc. The insurance module 325 may be configured to utilize service provider information in rating factors for providing insurance to the user. The insurance module 325 may derive rating factors for providing insurance based on various information, such as which service providers the user utilizes, when the services are requested, and/or what type of services are utilized or provided. Additionally, the insurance module 325 may be configured to utilize the insurance information 328 and specifically the knowledge and information of previous accidents, insurance claims, and driving history to assist in selecting the best known routes or service providers for the user. Additionally, the insurance module 325 may be configured to utilize the insurance information 328 known about a particular user or service provider and the insurance information 328 about users or service providers with similar characteristics to provide a prioritized rank and/or recommendations regarding known routes and service providers utilized. The insurance module 325 and the reward module 320 may be configured to provide a reward depending on the service provider selected by the user and potentially the services utilized by the user. If the user chooses a service provider qualified by the insurance module, the insurance module 325 and reward module 320 may provide an insurance reward, such as a discount on future premiums, increased coverage, or decreased deductibles.

The electronic payment module 330 may be configured to allow for and provide an electronic payment for the services rendered. The electronic payment module 330 may be configured to allow for the electronic payment to be automatic with a pre-entered payment method, such as credit card information, bank information, PayPal, google wallet, etc. With the automatic electronic payment method, the electronic payment module 330 will automatically send the payment information to the service provider server 350 after an order has been placed. Additionally, the electronic payment module 330 may be configured to allow for manual individual input of payment methods with each service provider. In the manual electronic payment method, a service request may not be complete until the user manually inputs payment information to pay for the services. Additionally, the electronic payment module 330 may be configured to provide a yearly membership for the services, whereas the customer does not pay for each individual service request.

The evaluation module 335 may be configured to allow and provide evaluations, ratings, and comments for the users and the service providers. The evaluation module 335 may provide the user with the ability to submit an evaluation/feedback of the service provider. The evaluation module 335 may also provide the service provider with the ability to submit evaluation/feedback of the user. The evaluation module 335 may include a simple form to rate the service provider and/or the user. The evaluation module 335 may utilize ratings such at excellent, very good, good, or poor. A numerical rating system may be utilized as well, such as a ranking from 1 to 5 or 1 to 10. The evaluation module 335 may also provide a comments section for the user or service provider to leave for the given service request. The evaluation module 335 may also consolidate, record, and present the various ratings for each service provider and user such that the service providers and users can view this data and use this data in order to make future decisions with providing services.

Figure 4:
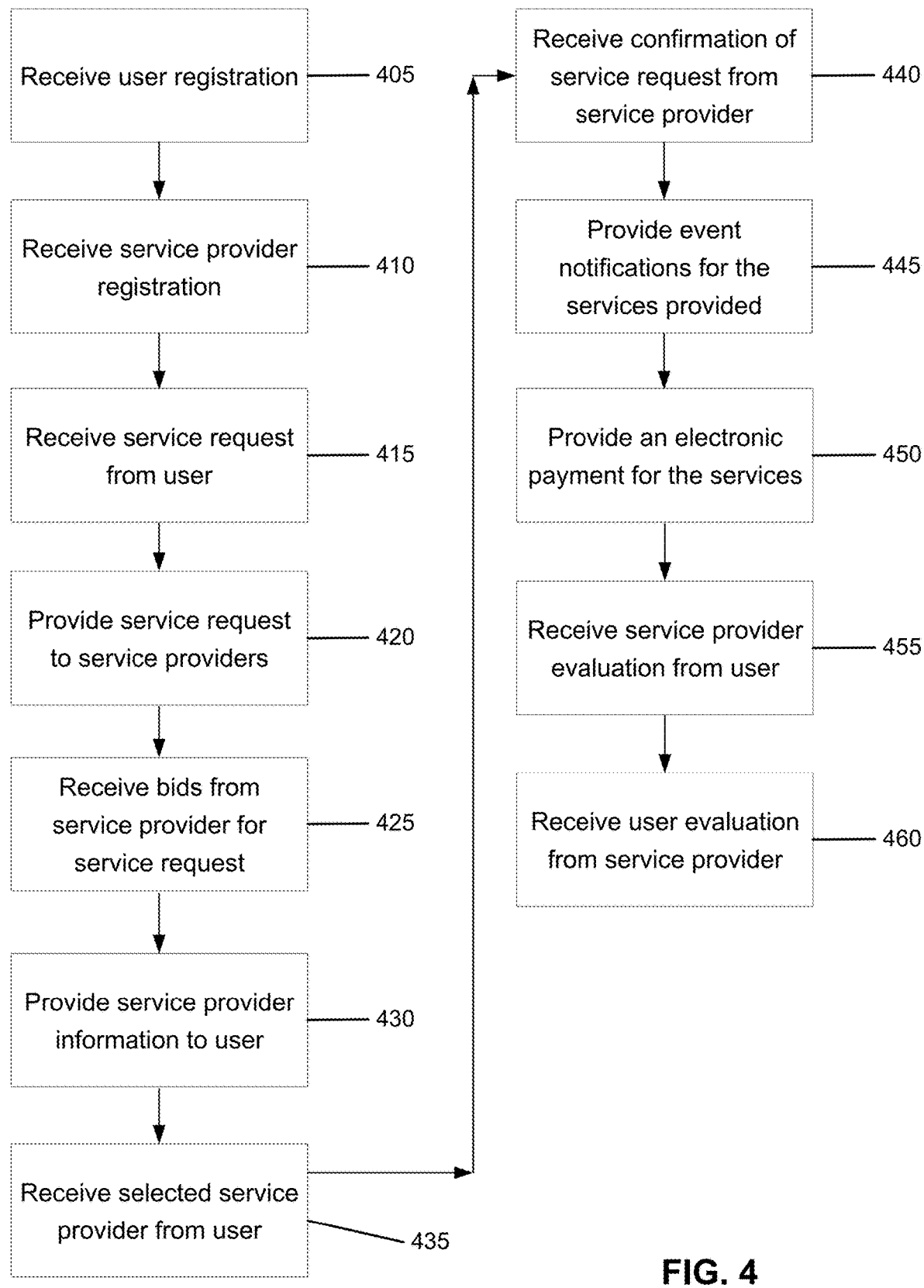
FIG. 4 illustrates a method of providing a mobile service provider system and application in accordance with aspects of the disclosure.

The steps that follow in FIG. 4 may be implemented by one or more of the components in FIGS. 1 through 3 and/or other components, including other computing devices. FIG. 4 illustrates an example process 400 by which a user may utilize a computer-implemented method and system and a mobile service provider application 300. The mobile service provider application 300 may be located on a user's mobile device 215, such a cell phone, a smart phone, or tablet/laptop computer. The computer-implemented method and system and the mobile service provider application 300 may also be able to be utilized via any internet connection on a given website or through an internet application. The mobile service provider application 300 may also be located on a vehicle's on-board computer or navigation system. The mobile service provider application 300 may be configured to allow for individuals to be or independent contractor service providers. The mobile service provider application 300 may include the use of an application on a mobile device that provides, GPS information, telematics information, and service provider information to locate the service providers; prioritizes the service providers based on the user preferences, telematics information, and service provider information; and facilitates the service provider request and the electronic payment for the services. The mobile service provider system 100 may allow the individual to register as a service provider and include their skills. The mobile service provider system 100 may provide a performance rating and/or user comments for the service providers. When a user needs services, such as a tire repair, the mobile service provider system 100 may notify the service providers that meet predetermined criteria and allows them to bid on the services. The mobile service provider system 100 may then select a service provider or allows the user to select the service provider. The mobile service provider system 100 can include roadside services, automobile services, home services, and personal services. Telematics information regarding the user and/or the vehicle may be utilized to provide information regarding the service provider's location, velocity (instantaneous and average), route, and destination. The computer-implemented method and system may utilize insurance information to provide additional features and to enhance the mobile service provider methods and systems by providing known and safe routes and recommendations to the user as described and detailed below.

In step 405, the mobile service provider system 100 may receive a registration from a user. In this step 405, the user may register for the mobile service provider application 300 on a mobile device 215, such as a cell phone, a smart phone, or a tablet/laptop computer to register. The user may register via an internet form, an iOS form, a social media platform (Facebook, twitter, google, etc.). The registration may be via conventional means such as through a targeted offer or mailing sent in an email or letter. Furthermore, the mobile service provider system 100 may validate or qualify a user using the insurance information. For example, the mobile service provider system 100 may qualify, validate, or verify the user utilizing the insurance information 328 as described and provided by the insurance server 327, such as safe driver information or current payment information. This qualification, validation, and/or verification may provide a pre-screening tool of the users.

In step 410, the mobile service provider system 100 may receive a registration from a service provider. In this step 410, a service provider may register as a possible service provider for a given service. The service provider may list or check the various services that the service provider can perform and assist with. The service provider may register via the mobile service provider application 300 on a mobile device 215, such as a cell phone, a smart phone, or a tablet/laptop computer to register. The service provider may also register via an internet form, an iOS form, a social media platform (Facebook, twitter, google, etc.). The registration may be via conventional means such as through a targeted offer or mailing sent in an email or letter. Furthermore, the mobile service provider system 100 may validate or qualify a service provider using the insurance information. For example, the mobile service provider system 100 may qualify, validate, or verify the service provider utilizing the insurance information 328 as described and provided by the insurance server 327, such as safe driver information or current payment information. This qualification, validation, and/or verification may provide a pre-screening tool of the service providers thereby providing a pre-scanned service provider to the users.

In step 415, the mobile service provider system 100 may receive a service request from the user. The service request may be in the form of an online form, via a mobile device 215, etc. In this step 415, the user selects one of the various services provided by the mobile service provider system 100. For example, the services may include roadside services, automobile services, home services, and personal services. roadside services may include, but not be limited to flat tire assistance, towing services, and fuel services. Automobile services may include, but not be limited to automobile repairs, oil changes, scheduled maintenance appointments, etc. Home services may include, but not be limited to lawn services, landscaping services, window washing services, handyman services, cleaning services, gutter cleaning services, tree removal services, construction services, etc. Personal services may include, but not be limited to salon services, sober driving services, etc. Additionally, in this step 415, the user may suggest a price for the service or a price range for the service.

In step 420, the mobile service provider system 100 may provide the service request to a set of service providers. In this step 420, the mobile service provider system 100 sends the service request to a set of service providers who meet the requirements of the user request. For example, the mobile service provider system 100 may determine one or more service providers that can meet the service request provided by the user. The mobile service provider system 100 may utilize various information to assist with matching the service providers and the user. The mobile service provider system 100 may search and identify any available professional service providers. The mobile service provider system 100 may search and identify any available service providers based on the preferences of the user requesting the services and the service providers.

Additionally, in this step 420, the telematics information of the service providers and the user may be sent from a telematics device 225 located in the vehicle or as part of the mobile device 215. The telematics information may include information regarding the user and/or the user's vehicle. The telematics information may also include information regarding the service provider and/or the service provider's vehicle. The telematics information may include information such as location, velocity (both instantaneous and/or average), direction of travel, route and final destination. This telematics information may then be utilized to assist in providing further information to the mobile service provider system 100 and the mobile service provider application 300. Utilizing telematics information and/or insurance information (driving habits), the mobile service provider system 100 may know the driving routes and the known locations of various service providers when the service request is made and may therefore match up given service providers who are located advantageously to the location that the services will be performed.

In step 425, the mobile service provider system 100 may receive bids from the service providers for the service request. In this step 425, the service provider may review the service request and provide a bid for completing the service request. If the user has requested a specific price or price range, the service provider will either accept or reject the service request at the user's requested price. Additionally, the mobile service provider system 100 may utilize a pre-negotiated rate for a type of service and the service provider will then either accept or reject the service request at the pre-negotiated rate.

In step 430, the mobile service provider system 100 may provide service provider information to the user. In this step 430, the mobile service provider system 100 may provide a prioritized ranking of the service providers based on telematics information and the service request. For example, if the service request includes a flat tire request, the system will provide a prioritized ranking of flat tire service providers closest to the user and based on the service providers known direction of travel and or route/destination. Additionally, based on the telematics data and the service request, the mobile service provider system 100 may know where the user is located and the location and the direction of travel of the service providers and therefore provide the safest route and/or the shortest route for the service provider and/or a prioritized list of those service providers. Additionally, based on the telematics data and the service request, the mobile service provider system 100 may provide a list of the highest ranked or highest rated service providers for the prioritized list of services.

In step 435, the mobile service provider system 100 may receive a selected service provider from the user. In this step 435, the mobile service provider system 100 may either select the service provider for the user or allow the user to select the service provider. The mobile service provider system 100 may determine a prioritized ranking of service provider based on one or more of the following: the telematics information, insurance information, and the service request. Additionally, mobile service provider system 100 may utilize the bid price of the service and timing of the starting and completing the service request when selecting the service provider. Additionally, the mobile service provider system 100 may provide the user with a number of different options of service providers, such as three service providers and allow the user to select which service provider they would like. The user may be given different pricing and timing based on different potential service providers. In different situations, cost may be less significant and convenience or timing may become more significant. The user may be able to select these features to assist with selecting the service provider.

In step 440, the mobile service provider system 100 may receive confirmation of the service request from the service provider. In this step 440, after the service provider has been selected, the service provider will then confirm the service request, confirm the pricing, and confirm the start and completion time/date for the service request. The mobile service provider system 100 may receive this confirmation from the service provider.

In step 445, the mobile service provider system 100 may provide event notifications for the services provided. In this step 445, the mobile service provider system 100 may provide various service notifications from the service provider to the user. The mobile service provider system 100 may provide the user with information regarding the status of the services, i.e. service confirmation, start time, service provider en-route, service provider onsite, service completed, and/or service canceled.

In step 450, the mobile service provider system 100 may provide an electronic payment for the services. In this step 450, the mobile service provider system 100 may also provide an electronic payment for the services to the service provider server 350. The electronic payment may be made automatically to the service provider server 350 and facilitated by the user entering their payment information into the mobile service provider application 300 during a set-up portion of the application. The electronic payment may also be made to the service provider server 350 manually for an individual order by entering the payment information when the order is placed. Additionally, the electronic payment may also be made for a yearly membership for the services, whereas the customer does not pay for each individual service request.

In step 455, the mobile service provider system 100 may receive a service provider evaluation from the user. In this step 455, the mobile service provider system 100 may allow and provide evaluations, ratings, and comments for the users to complete on the service provider. The mobile service provider system 100 may provide the user with the ability to submit an evaluation/feedback of the service provider. The evaluation may include a simple form to rate the service provider. The evaluation may utilize ratings such at excellent, very good, good, or poor. A numerical rating system may be utilized as well, such as a ranking from 1 to 5 or 1 to 10. The evaluation may also provide a comments section for the user to leave for the given service request. The evaluation may also be saved, consolidated, and recorded for the various ratings for each service provider such that the users can view this data and use this data in order to make future decisions with providing services.

In step 460, the mobile service provider system 100 may receive a user evaluation from the service provider. In this step 460, the mobile service provider system 100 may allow and provide evaluations, ratings, and comments for the service provider to complete on the user. The mobile service provider system 100 may provide the service provider with the ability to submit an evaluation/feedback of the user and the experience and transaction with the user. The evaluation may include a simple form to rate the user. The evaluation may utilize ratings such at excellent, very good, good, or poor. A numerical rating system may be utilized as well, such as a ranking from 1 to 5 or 1 to 10. The evaluation may also provide a comments section for the service provider to leave for the given service request. The evaluation may also be saved, consolidated, and recorded for the various ratings for each user such that the service providers can view this data and use this data in order to make future decisions with providing services.

According to some arrangements, the process described with respect to FIG. 4 may be provided by a mobile service provider application 300 executing on a device such as a user's mobile communication device 215, through the internet or on a webpage, or a user's vehicle computer or navigation system.

Figure 5:
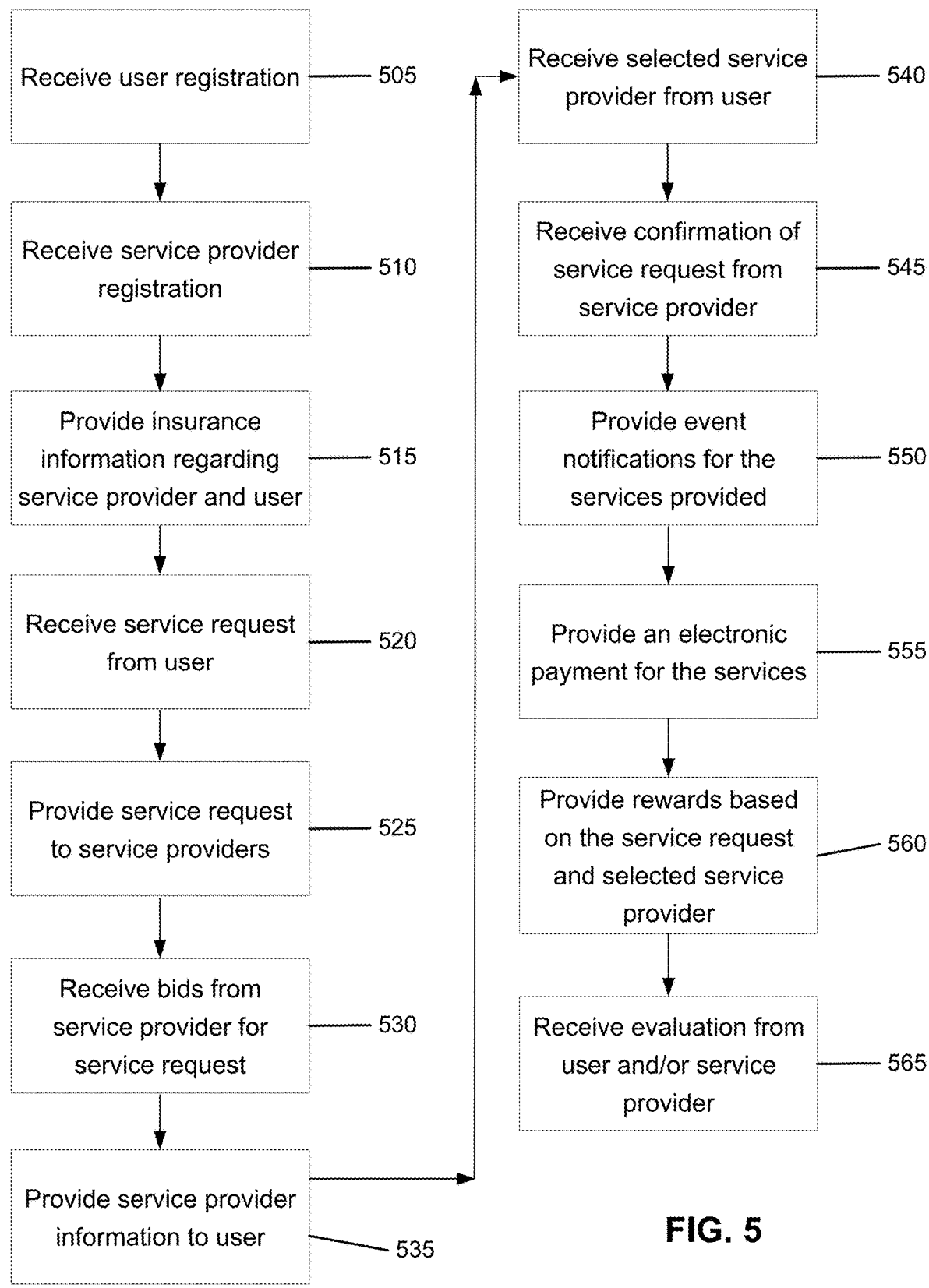
FIG. 5 illustrates another method of providing a mobile service provider system and application that includes insurance aspects in accordance with aspects of the disclosure.

As was described above, the insurance module 325 may be utilized with the computer-implemented method and system and a mobile service provider application. The steps that follow in FIG. 5 may be implemented by one or more of the components in FIGS. 1 through 3 and/or other components, including other computing devices. FIG. 5 illustrates an example process 500 by which a user may utilize a computer-implemented method and system and a mobile service provider application 300 with insurance aspects. The mobile service provider application 300 may be located on a user's mobile device 215, such a cell phone, a smart phone, or tablet/laptop computer. The computer-implemented method and system and the mobile service provider application 300 may also be able to be utilized via any internet connection on a given website or through an internet application. The mobile service provider application 300 may also be located on a vehicle's on-board computer or navigation system. The mobile service provider application 300 may be configured to allow for individuals to be service providers. The mobile service provider application 300 may include the use of an application on a mobile device that provides telematics information, service provider information to locate the service providers; prioritizes the service providers based on the user preferences, telematics information, and service provider information; and facilitates the service provider request and the electronic payment for the services. The mobile service provider system 100 may allow the individual to register as a service provider and include their skills. The mobile service provider system 100 may provide a performance rating and/or user comments for the service providers. When a user needs services, such as a tire repair, the mobile service provider system 100 may notify the service providers that meet predetermined criteria and allows them to bid on the services. The mobile service provider system 100 may then select a service provider or allows the user to select the service provider. The mobile service provider system 100 can include roadside services, automobile services, home services, and personal services. Telematics information regarding the user and/or the vehicle may be utilized to provide information regarding the service provider's location, velocity (instantaneous and average), route, and destination. The computer-implemented method and system may utilize insurance information to provide additional features and to enhance the mobile service provider methods and systems by providing known and safe routes and recommendations to the user as described and detailed below.

In step 505, the mobile service provider system 100 may receive a registration from a user. In this step 405, the user may register for the mobile service provider application 300 on a mobile device 215, such as a cell phone, a smart phone, or a tablet/laptop computer to register. The user may register via an internet form, an iOS form, a social media platform (Facebook, twitter, google, etc.). The registration may be via conventional means such as through a targeted offer or mailing sent in an email or letter. Furthermore, the mobile service provider system 100 may validate or qualify a user using the insurance information. For example, the mobile service provider system 100 may qualify, validate, or verify the user utilizing the insurance information 328 as described and provided by the insurance server 327, such as safe driver information or current payment information. This qualification, validation, and/or verification may provide a pre-screening tool of the users.

In step 510, the mobile service provider system 100 may receive a registration from a service provider. In this step 510, a service provider may register as a possible service provider for a given service. The service provider may list or check the various services that the service provider can perform and assist with. The service provider may register via the mobile service provider application 300 on a mobile device 215, such as a cell phone, a smart phone, or a tablet/laptop computer to register. The service provider may also register via an internet form, an iOS form, a social media platform (Facebook, twitter, google, etc.). The registration may be via conventional means such as through a targeted offer or mailing sent in an email or letter. Furthermore, the mobile service provider system 100 may validate or qualify a service provider using the insurance information. For example, the mobile service provider system 100 may qualify, validate, or verify the service provider utilizing the insurance information 328 as described and provided by the insurance server 327, such as safe driver information or current payment information. This qualification, validation, and/or verification may provide a pre-screening tool of the service providers thereby providing a pre-scanned service provider to the users.

In step 515 the mobile service provider system 100 may also provide insurance information 328 regarding the service providers and the users. Insurance information 328 may be utilized with the computer-implemented method and system that may reside on an insurance server 327. The insurance information 328 may include information about a particular user or service provider, location and instances of previous accidents, locations and instances of previous claims, driving history, and information about other users and service providers with similar characteristics, etc.

In addition to step 515, the mobile service provider system 100 may provide additional ranking of service providers based on the insurance information 328. The mobile service provider system 100 may use the insurance information 328 of previous accident locations, driving history, and claims to assist in selecting the route from the service provider to a location of the service request. The mobile service provider system 100 may provide recommendations for the safest routes and rate the routes and the potential service providers based on the previous accidents, driving history, and claims in the insurance information 328.

The mobile service provider system 100 may also use the insurance information 328 of the particular user and information about users with similar characteristics to provide recommendations regarding routes and service request locations. Based on the user and service provider characteristics and past behavior, the mobile service provider system 100 may prioritize a list of potential service providers or routes for the selected service provider that the system determines will best meet the preferences of the user.

In step 520, the mobile service provider system 100 may receive a service request from the user. The service request may be in the form of an online form, via a mobile device 215, etc. In this step 520, the user selects one of the various services provided by the mobile service provider system 100. For example, the services may include roadside services, automobile services, home services, and personal services. roadside services may include, but not be limited to flat tire assistance, towing services, and fuel services. Automobile services may include, but not be limited to automobile repairs, oil changes, scheduled maintenance appointments, etc. Home services may include, but not be limited to lawn services, landscaping services, window washing services, handyman services, cleaning services, gutter cleaning services, tree removal services, construction services, etc. Personal services may include, but not be limited to salon services, sober driving services, etc. Additionally, in this step 520, the user may suggest a price for the service or a price range for the service.

In step 525, the mobile service provider system 100 may provide the service request to a set of service providers. In this step 525, the mobile service provider system 100 sends the service request to a set of service providers who meet the requirements of the user request. For example, the system may determine one or more service providers that can meet the service request provided by the user. The mobile service provider system 100 may utilize various information to assist with this matching the service providers and the user. The mobile service provider system 100 may search and identify any available professional service providers. The mobile service provider system 100 may search and identify any available service providers based on the preferences of the user requesting the services and the service providers.

Additionally, in this step 525, the telematics information of the service providers and the user may be sent from a telematics device 225 located in the vehicle or as part of the mobile device 215. The telematics information may include information regarding the user and/or the user's vehicle. The telematics information may also include information regarding the service provider and/or the service provider's vehicle. The telematics information may include information such as location, velocity (both instantaneous and/or average), direction of travel, route and final destination. The mobile service provider system 100 may then utilize the telematics information to assist in providing further information to the system and the mobile service provider application 300. Utilizing telematics information and/or insurance information (driving habits), the mobile service provider system 100 may know the driving routes and the known locations of various service providers when the service request is made and may therefore match up given service providers who are located advantageously to the location that the services will be performed.

In step 530, the mobile service provider system 100 may receive bids from the service providers for the service request. In this step 530, the service provider may review the service request and provide a bid for completing the service request. If the user has requested a specific price or price range, the service provider will either accept or reject the service request at the user's requested price. Additionally, the mobile service provider system 100 may utilize a pre-negotiated rate for a type of service and the service provider will then either accept or reject the service request at the pre-negotiated rate.

In step 535, the mobile service provider system 100 may provide service provider information to the user. In this step 535, the mobile service provider system 100 may provide a prioritized ranking of the service providers based on telematics information and the service request. For example, if the service request includes a flat tire request, the system will provide a prioritized ranking of flat tire service providers closest to the user and based on the service providers known direction of travel and or route/destination. Additionally, based on the telematics data and the service request, the mobile service provider system 100 may know where the user is located and the location and the direction of travel of the service providers and therefore provide the safest route and/or the shortest route for the service provider and/or a prioritized list of those service providers. Additionally, based on the telematics data and the service request, the mobile service provider system 100 may provide a list of the highest ranked or highest rated service providers for the prioritized list of services.

In step 540, the mobile service provider system 100 may receive a selected service provider from the user. In this step 540, the mobile service provider system 100 may either select the service provider for the user or allow the user to select the service provider. The system may determine a prioritized ranking of service provider based on one or more of the following: the telematics information, insurance information, and the service request. Additionally, the mobile service provider system 100 may utilize the bid price of the service and timing of the starting and completing the service request when selecting the service provider. Additionally, the mobile service provider system 100 may provide the user with a number of different options of service providers, such as three service providers and allow the user to select which service provider they would like. The mobile service provider system 100 may send the user different pricing and timing based on different potential service providers. In different situations, cost may be less significant and convenience or timing may become more significant. The user may be able to select these features to assist with selecting the service provider.

In step 545, the mobile service provider system 100 may receive confirmation of the service request from the service provider. In this step 545, after the service provider has been selected, the service provider will then confirm the service request, confirm the pricing, and confirm the start and completion time/date for the service request. The mobile service provider system 100 may receive this confirmation from the service provider.

In step 550, the mobile service provider system 100 may provide event notifications for the services provided. In this step 550, the mobile service provider system 100 may provide various service notifications from the service provider to the user. The mobile service provider system 100 may provide the user with information regarding the status of the services, i.e. service confirmation, start time, service provider en-route, service provider onsite, service completed, and/or service canceled.

In step 555, the mobile service provider system 100 may provide an electronic payment for the services. In this step 555, the mobile service provider system 100 may also provide an electronic payment for the services to the service provider server 350. The electronic payment may be made automatically to the service provider server 350 and facilitated by the user entering their payment information into the mobile service provider application 300 during a set-up portion of the application. The electronic payment may also be made to the service provider server 350 manually for an individual order by entering the payment information when the order is placed. Additionally, the electronic payment may also be made for a yearly membership for the services, whereas the customer does not pay for each individual service request.

In step 560, the mobile service provider system 100 may provide rewards to the user depending on the service provider chosen by the user and/or the services provided to the user. The mobile service provider system 100 may also provide rewards based on the user's decision to follow the recommendations of the system. The rewards may include cash back, a reward with the service provider, a discount with the service provider, and/or bonus services. Additionally, the mobile service provider system 100 may provide insurance rewards to the user depending on the service provider chosen by the user and/or the services provided to the user. The mobile service provider system 100 may also provide insurance rewards based on the user's decision to follow the recommendations of the system. The insurance rewards may include discounts on future premiums, increased insurance coverage, and/or decreased deductible.

In step 565, the mobile service provider system 100 may receive an evaluation from a user and/or a service provider. In this step 565, the mobile service provider system 100 may allow and provide evaluations, ratings, and comments for the users/service providers to complete on the service request. The mobile service provider system 100 may provide the user/service providers with the ability to submit an evaluation/feedback of the service request. The evaluation may include a simple form to rate the service request. The evaluation may utilize ratings such at excellent, very good, good, or poor. The evaluation may also utilize a numerical rating system, such as a ranking from 1 to 5 or 1 to 10. The evaluation may also provide a comments section for the user/service provider to leave for the given service request. The mobile service provider system 100 may save, consolidate, and record the evaluation reports for the various ratings for each user/service provider such that future users and service providers can view this data and use this data in order to make future decisions with future service requests.

According to some arrangements, the process described with respect to FIG. 5 may be provided by a mobile service provider application 300 executing on a device such as a user's mobile communication device 215 through the internet or on a webpage, or a user's vehicle computer or navigation system.

According to another aspect of this invention, the mobile service provider system 100 may optimize job assignments of the service providers based on knowing where the service providers are located—such as tow trucks. In this example, the mobile service provider system 100 may know where the tow trucks of a given service provider are located. The mobile service provider system 100 may then optimize the job assignments, routes and jobs, of this service provider by knowing where the tow truck is located. Additionally, to further optimize the job assignments, the mobile service provider system 100 may pre-position tow trucks in a particular geo-reference based on the past history of needed and known repairs (utilizing the insurance information as presented previously). While this example utilized tow trucks as the service provided, this job assignment optimization feature could be utilized with any given service provider in a similar manner.

According to another aspect of this invention, mobile service provider system 100 may include various rules criteria and evaluation for the mobile service provider system 100. For example, for initial service provider selection, the following rules criteria and evaluation may be utilized: the distance from the service provider to the user, the service provider's availability (whether the service provider is logged on), and the service type requested. In another example, for second service provider selection, the total distance may be a rules criteria and evaluation—meaning that the service provider is available however working at a different service request. The mobile service provider system 100 may then calculate the actual distance including the current service destination and then the future service destination between the previous service designation and the current user location. In another example, for a third provider selection after the bid, the mobile service provider system 100 may select one professional, one up-sell offer, and N number of service providers. The mobile service provider system 100 may then utilized the following rules criteria and evaluation: cost, total service distance (current location+current service destination, if any+new customer location+new customer final destination), estimated time of arrival, service ratings and performance ratings, and service provider company (reviewing any preferred vendors).

In another aspect of the invention, the mobile service provider system 100 may include capabilities in handling exception conditions. Exception conditions may happen during the overall process execution which require some kind of manual intervention. Some example exception conditions may include: the service provider cannot service the service request after acceptance, the user cancels the service request without informing the mobile service provider system 100 or the service provider, the service provider cannot find the user or the location of the service request, there is a service mismatch between what's ordered and what is needed, damaged property during the service, or the user complains that the service level agreement (SLA) is not met.

In another aspect of the invention, the mobile service provider system 100 may include capabilities in handling external special events. Special events may be those external events that impact the overall service fulfillment. Some example special events may include: large number of service requests anticipating due to weather, historical patterns, special events such as games, New Year, etc.; and large anticipated service request that is too difficult to handle.

Figure 7:
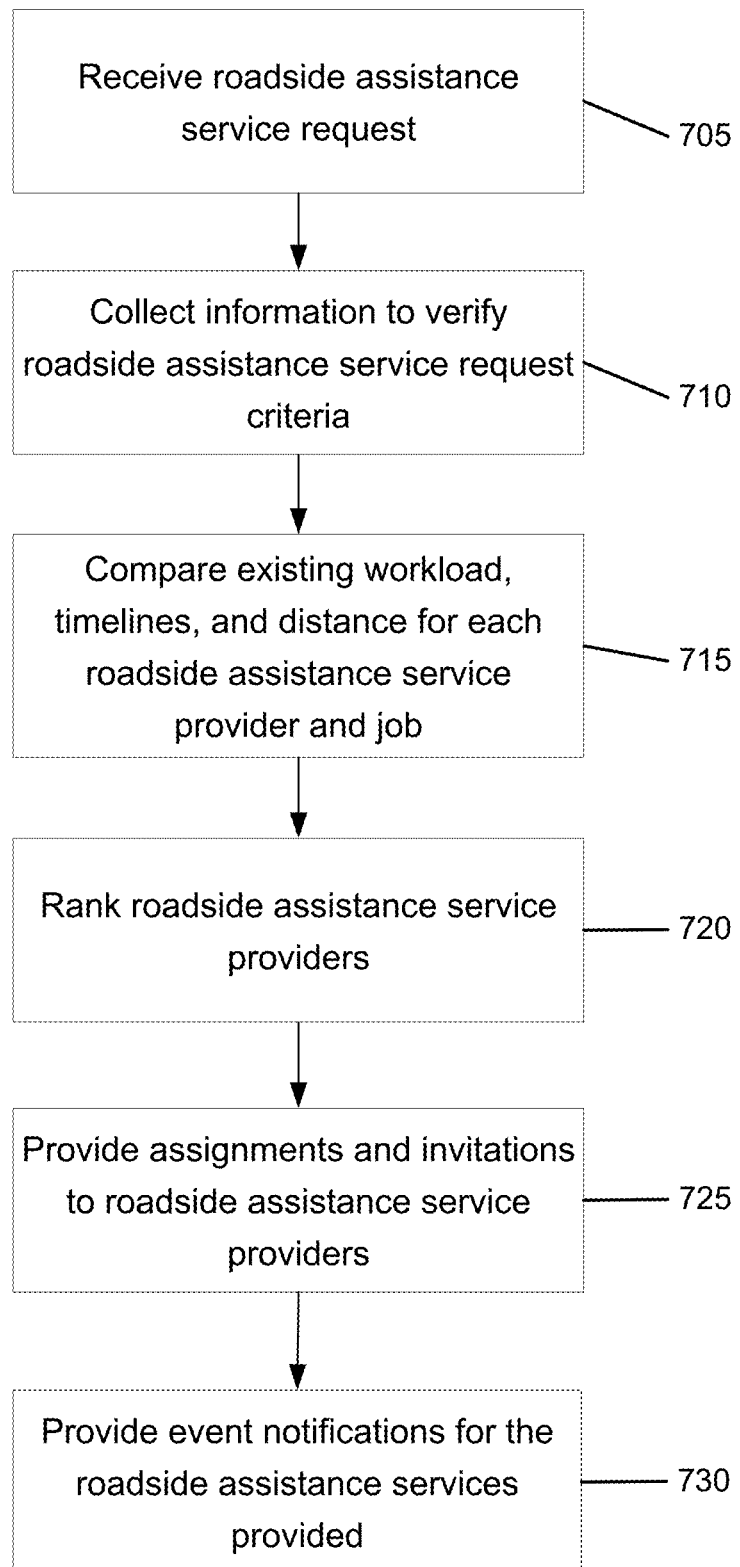
FIG. 7 illustrates a method of providing a roadside assistance service provider system in accordance with aspects of the disclosure.
Figure 8:
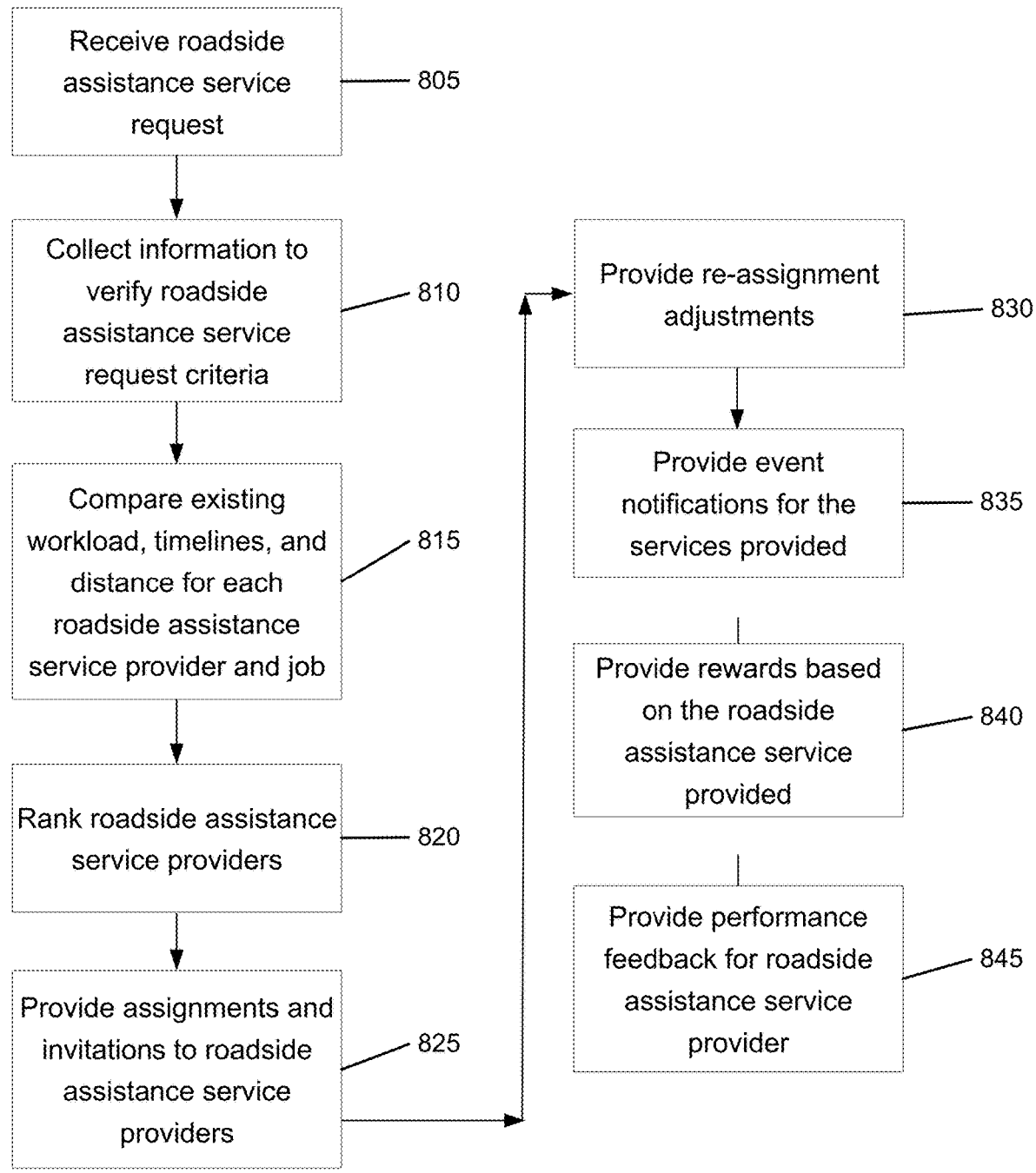
FIG. 8 illustrates another method of providing a roadside assistance service provider system in accordance with aspects of the disclosure.

In another embodiment in accordance with aspects of this invention, FIGS. 6 through 8 illustrate a roadside assistance service provider system 600 that may be utilized for the assignment of roadside assistance service providers, such as tow trucks, to distressed vehicles/drivers requiring roadside assistance. Though some prior art systems might automatically assign tow truck drivers based just on the proximity to a distressed vehicle, the roadside assistance service provide system 600 takes a more sophisticated approach to collecting various types of data through sensors and systems, analyzing that data, and assigning truck drivers based on a complex plurality of factors and characteristics for a more optimized assignment. It is understood to one skilled in the art that the embodiment described and disclosed above and in FIGS. 1-5 may be used together with these embodiments illustrated in FIGS. 6-8 and described below.

Generally, the roadside assistance service provider system 600 may include a collection module 610, an assignment module 620, and a feedback module 630. In the collection module 610 (or gathering/collection module), sensors on a tow truck or other similar vehicles (e.g. whether the flatbed is down, GPS location monitoring, etc.), smartphone user interfaces, and historical statistics about roadside assistance services (e.g. the historical average time for changing a flat tire, for jumping a dead battery, etc.) may be collected from the real world and stored in a data store, then analyzed using particular rules and/or formats. In the assignment module 620, particular roadside assistance service providers may be assigned to particular distressed vehicles/drivers based on one or more characteristics, including characteristics/rules from the collection module 610. For example, the assignment module 620 may match/assign a driver that only speaks Polish with a tow truck driver that understands Polish. Other characteristics/criteria utilized by the assignment module 620 may include proximity in location, prior user ratings, equipment on the tow truck, skillset/expertise of the driver of the tow truck, price/cost of the tow truck roadside assistance services, etc. The feedback/display module 630 may provide near real-time cues to the tow truck driver's mobile device, such as alerting when the amount of time spent on a task exceeds a predefined threshold, flagging high priority tasks/assignments, providing a technical reference for the repair, etc., and award points/score to the tow truck driver.

FIG. 6 is an example block diagram of the roadside assistance service provider system 600 and a roadside assistance service provider server 605. The roadside assistance service provider server 605 may include a variety of software or firmware modules such as one or more of the following: a collection module 610, an assignment module 620, a feedback module 630, a reward module 640, and an insurance module 650. Each of these modules may be utilized by the roadside assistance service provider server 605.

Generally, the collection module 610 collects roadside assistance service provider information from real-world and stores the information in a database 121 that may then be analyzed using particular rules and formulas. The roadside assistance service provider information may be collected from sensors on a tow truck or other vehicles, such as whether the flatbed is down, GPS location monitoring, etc.

The roadside assistance service provider information may also be collected from smartphone user interfaces. Additionally, the collection module 610 may collect historical statistics about roadside assistance services, such as the historical average time for changing a flat tire, for jumping a dead battery, etc. Further, the collection module 610 may collect roadside assistance information. The roadside assistance information may include and not be limited to: real-time equipment information, real-time GPS information, historical statistical data for various tasks and/or roadside assistance services. This roadside assistance information may then be stored in a database 121 and then analyzed using particular rules, formulas or other factors or characteristics. The collection module 610 may be configured to do one or more of the following: receive roadside assistance service request and collect information to verify roadside assistance service request criteria.

The collection module 610 may allow and facilitate the user requesting services. The requested services may include but not be limited to one or more of the following jobs or tasks: jump start automobile, flat tire change, tow automobile, locked out of car, etc. The collection module 610 may also collect information to verify every new roadside assistance service request to ensure the request meets particular criteria. For example, the collection module 610 may verify that the roadside assistance service request or task is not currently assigned. The collection module 610 may also verify that the roadside assistance service provider is not enrolled in auto-assignment. The collection module 610 may also verify the roadside assistance service providers that are logged-in and available. Any driver or roadside assistance service provider logged into the roadside assistance service provider system 600 may be considered in the list of roadside assistance service providers for a given job or task. Additionally, the collection module 610 may be configured to provide a qualification, validation, or verification of a given roadside assistance service provider. For example, the collection module 610 may qualify, validate, or verify the roadside assistance service provider using the insurance information 665 as described and provided by the insurance server 660, such as safe driver information or current payment information. This qualification, validation, and/or verification may provide a pre-screening tool for the roadside assistance service providers to ensure a quality and safe roadside assistance service provider.

The collection module 610 may also receive a registration by the roadside assistance service provider. The registration may be via a mobile application, a web component, an internet form, an iOS form, a social media platform (Facebook, twitter, google, etc.). The registration may be via conventional means such as through a targeted offer or mailing sent in an email or letter.

The collection module 610 may also include various sensors and other information regarding the vehicles and tow trucks. For example, various sensors may be located on a tow truck or other vehicles. The sensors may provide information such as whether the flatbed is down, the GPS location, or other similar information. The collection module 610 may be configured to receive, evaluate, and analyze a roadside assistance service provider's telematics information, such as location, velocity, direction of travel, route, and destination, as well as the distressed vehicle's location, velocity, direction of travel, route, and destination. Once a service is requested, the collection module 610 may also determine the amount of time for each task for the requested roadside assistance service necessary for a given roadside assistance service provider, for example getting fuel will take 5 minutes for all drivers. The collection module 610 may aggregate the time from many different drivers and service providers. The roadside assistance service provider system 600 and collection module 610 may learn from driver's or service provider's history as to the amount of time it takes to engage and complete a particular task. This information may later be utilized in the assignment module 615 in helping to assign the roadside assistance service provider to a roadside assistance service request. Additionally, the collection module 610 may include various industry estimates for tasks and subtasks for given roadside assistance services and this information may be utilized for driver customization during the assignment process with the assignment module 615. Additionally, historical statistics about roadside assistance services such as the historical average for a given task, such as changing a flat tire, or jumping a dead battery, etc, may be collected from the real world and stored in a database. This information may then be analyzed using particular rules and formulas to determine the roadside assistance service providers.

Additionally, the collection module 610 may be configured to interface with one or more other roadside assistance service provider systems. The collection module 610 may be configured to provide details of a given roadside assistance service provider, such as location, services provided, roadside assistance service provider ratings, roadside assistance service provider reviews, etc. Additionally, the collection module 610 may be configured to provide real-time information about a given roadside assistance service provider, such as wait time, service time, service availability, etc. The collection module 610 may provide real-time roadside assistance service provider information.

Generally, the assignment module 615 may assign particular roadside assistance service providers to particular distressed vehicles/drivers based on one or more characteristics, including characteristics/rules from the collection module 610. The assignment module 615 may be configured to do one or more of the following: compare existing workload, timelines, and distance for each roadside assistance service provider and requested service; rank roadside assistance service providers; and provide assignments and invitations to roadside assistance service providers.

The assignment module 615 may compare the existing workload, timelines, and distances for each of the various roadside assistance service providers and the requested service. The assignment module 615 may utilize many factors, such as considering the current queue and the amount of time to complete tasks in the queue. The assignment module 615 may also consider and factor the skill levels required to complete a given task, for example a skill level 1 may use a factor of 2 for time estimates. The assignment module 615 may also consider and factor the skill level and whether a driver or roadside assistance service provider is allowed and/or capable of working on a specific job or task, utilizing it as a qualifier. The assignment module 615 may also consider and factor the price of the driver, any particular skills of the driver, the match with the user or customer, and the equipment of the driver. The assignment module 615 may also consider how long the driver will take at their current job, utilizing information from the collection module 610. The assignment module 615 may also consider weather, time of day, traffic, neighborhood, type of road, etc. which may cause the tasks onsite to take longer to perform. The assignment module 615 may also utilize driver performance as a factor in assignment of the next jobs and prioritize tasks at which a certain driver is strong. Other factors and/or considerations may be utilized for assigning roadside assistance service providers without departing from this invention.

Additionally, the assignment module 615 may rank the roadside assistance service providers. The rankings may be based on time, then by distance if there is a tie, and then by on time performance if there is still a tie. Other rankings may be utilized for the roadside assistance service providers without departing from this invention. Following the rankings, the assignment module 615 may then send invitations and or assignments to the drivers or the roadside assistance service provider. If the driver accepts the invitation and assignment, the assignment module 615 may assign the roadside assistance service request to the driver. If the driver does not accept the invitation and assignment, the assignment module 615 may send the roadside assistance service request to the next driver or roadside assistance service provider on the list. Additionally, if there is no assignment after a given time frame (for example 10 minutes), then the assignment module 615 may send the roadside assistance service request back to a manual dispatcher for manual assignment.

Additionally, the assignment module 615 may be utilized for reassignment of a roadside assistance service request. During a reassignment, the assignment module 615 may shuffle the assignments during the middle of the assignment process. Current workloads may be shuffled as long as the driver or roadside assistance service provider is not yet at the roadside assistance site. Various situations may trigger the reassignment. One situation that may trigger a reassignment may be the flagging of a roadside assistance service request as a priority roadside assistance service in which particular jobs may override other jobs and may be highlighted to dynamically reassign jobs. One example of this priority flagging reassignment may be a person stranded on a highway and needs attention immediately. Another example of this priority flagging reassignment may be a person or distressed vehicle stranded in a dangerous location and needing attention immediately. Another situation that may trigger a reassignment may be the shifting of work to other roadside assistance service providers in a particular roadside assistance service provider is moving slowly during a given day. In this instance, a centralized screen or output may be utilized to show how different roadside assistance service providers are working and performing.

Additionally, the assignment module 615 may facilitate and allow the user to view the service provider's specific information. The service provider's specific information may include contact details and estimated time of arrival. The service provider's specific information may also include insurance information and verification data regarding the specific service provider.

Additionally, the assignment module 615 may be configured to do one or more of the following: view service request, bid service request, provide confirmation for the service request, and send roadside assistance event notifications (service start, en route, onsite, service complete, canceled service). The assignment module 615 may allow and provide the service provider to view and bid on a service request. The assignment module 615 may also allow and provide the service provider the ability to send roadside assistance event notifications for various service events. For example, the assignment module 615 may send an event notification confirming the service request. The assignment module 615 may also send an event notification for the start and completion of the service request. The assignment module 615 may also send an event notification for other events such as the service provider is en route, the service provider is onsite, or the service provider has canceled the service request.

The assignment module 615 may further be configured to recommend or provide a ranked list of roadside assistance service providers based on various factors, such as preferred roadside assistance service providers, safest route, fastest route, highest rated roadside assistance service providers, verified roadside assistance service providers, etc. The assignment module 615 may be in communication with the telematics device or in-vehicle device 225, wherein the telematics device 225 sends the telematics information to the assignment module 615.

Additionally, the assignment module 615 may further calculate and provide information regarding distance from nearest roadside assistance service provider to location of the service, time to travel (with or without traffic) from the roadside assistance service provider to location of the roadside assistance service, route information for selected roadside assistance service providers, etc. Additionally, for example, through various driving telematics information devices may provide or know the driving pattern of a user or a roadside assistance service provider. The assignment module 615 may know that the roadside assistance service provider may be driving by the user (service requestor) on their way home from work or through one of their known routes. The assignment module 315 may know and track the routes of the roadside assistance service providers based on the telematics information and the insurance information. The roadside assistance service provider request may be provided based on the known routes of a given roadside assistance service provider.

Generally, the feedback module 620 may provide near real-time cues to the tow truck driver's mobile device, such as alerting when the amount of time spent on a task exceeds a predefined threshold, flagging high priority tasks/assignments, providing a technical reference for the repair, etc., and award points/score to the tow truck driver. The feedback module 620 may be configured to do one or more of the following: provide roadside assistance event notifications for the services provided, provide rewards based on the roadside assistance service provided, and provide performance feedback for roadside assistance service providers. The feedback module 620 may provide feedback through a display.

As the drivers are progressing through a job or a roadside assistance service request, the feedback module 620 may provide status updates of the progress. The drivers may also update their status through the feedback module 620. The feedback module 620 may utilize telematics information to update and provide the notification of an updated status. The feedback module 620 may also utilized other information from the sensors that the tow has been activated or that the tow bed has been lowered to update and provide the notification of an updated status. A reminder or status update may pop-up as a visual indicator. The feedback module 620 may provide a reminder to tell the driver when the driver has gone beyond the average time for a particular task, and this task may be listed in red to signify that the driver is over the time. The feedback module 620 may also display a list of the tasks and the average time for each task. The driver may see these events or tasks in sequence. Additionally, the feedback module 620 may display or report that the driver is over or under a given time.

The feedback module 620 may also include a performance output or screen, which displays to the driver whether the driver is within their estimated time of arrival for meeting their roadside assistance service request. The feedback module 620 may also display or output to the driver whether the driver's performance meets average performance as well as the driver's past performance for the given tasks or roadside assistance services. The feedback module 620 may also calculate a performance score based on the given tasks or roadside assistance services. The feedback module 620 may output or display the driver's performance score that depends on the driver's ability to meet the timing of tasks as estimated or required. The feedback module 620 may also be able to identify a driver that performs weak at certain tasks for training the driver in those given tasks.

The feedback module 620 may provide a service provider or a user the ability to receive immediate information about a given roadside assistance service provider through the roadside assistance service feedback module 620. The feedback module 620 may also facilitate and allow the user to monitor the service provider's real-time location movement via mapping services and/or the telematics information from the telematics device 225. The feedback module 620 may also facilitate and allow the user to monitor the service provider's progress of completing the service.

The reward module 640 may be configured to provide a reward to an individual driver or roadside assistance service provider or roadside assistance service provider company if particular times are met. For example, the reward may allow a driver to move up in a queue in a definitive way if the roadside assistance service provider beats the estimate time or suggested times. Additionally, the reward module 640 may provide an individual driver or roadside assistance service provider an additional award if the job or tasks are done more quickly. The reward module 640 may provide awards based on accurate estimates and not necessarily doing a job or task more quickly.

Additionally, an insurance module 650 may be included with the roadside assistance service provider server 605. The insurance module 650 may include insurance information 665 that may reside on an insurance server 660 regarding information about a particular user, previous accidents, previous claims, information about other users with similar characteristics, etc. The insurance module 650 may also include insurance information 665 that may reside on an insurance server 660 regarding information about a particular roadside assistance service provider, previous accidents, previous claims, driving history, any other pertinent information about the roadside assistance service provider, and information about other roadside assistance service providers with similar characteristics, etc. Additionally, the insurance module 650 may work together with the assignment module 620 to utilize the insurance information 665 and specifically the knowledge and information of previous accidents, insurance claims, and driving history to assist in selecting the best known routes or service providers for the user. Additionally, the insurance module 650 may work together with the assignment module 620 to utilize the insurance information 665 known about a particular user or service provider and the insurance information 665 about users or service providers with similar characteristics to provide a prioritized rank and/or recommendations regarding known routes and service providers utilized. The insurance module 650 and the reward module 640 may be configured to provide a reward depending on the roadside assistance service provider performance and providing accurate estimates. For example, if the roadside assistance service provider meets particular times for tasks and/or provides accurate estimates for the tasks and jobs, the insurance module 650 and reward module 640 may provide an insurance reward, such as a discount on future premiums, increased coverage, or decreased deductibles.

The steps that follow in FIG. 7 may be implemented by one or more of the components in FIGS. 1 through 3 and FIG. 6 and/or other components, including other computing devices. FIG. 7 illustrates an example process 700 by which a user may utilize a computer-implemented method and system and a roadside assistance service provider system 600. The roadside assistance service provider system 600 may include sensors on a tow truck or other similar vehicles (e.g. whether the flatbed is down, GPS location monitoring, etc.), smartphone user interfaces and historical statistics about roadside assistance services (e.g. the historical average time for changing a flat tire, for jumping a dead battery, etc.) that may be collected from the real world and stored in a data store, and analyzed using particular rules and/or formats. Particular roadside assistance service providers may be assigned to particular distressed vehicles/drivers based on one or more characteristics, including characteristics/rules. Other characteristics/criteria may include proximity in location, prior user ratings, equipment on the tow truck, skillset/expertise of the driver of the tow truck, price of the tow truck, etc. Additionally, the roadside assistance service provider system 600 may provide near real-time cues to the tow truck driver's mobile device, such as alerting when the amount of time spent on a task exceeds a predefined threshold, flagging high priority tasks/assignments, providing a technical reference for the repair, etc., and award points/score to the tow truck driver. The computer-implemented method and system may utilize insurance information to provide additional features and to enhance the mobile service provider methods and systems by providing known and safe routes and recommendations to the user as described and detailed below.

In step 705, the roadside assistance service provider system 600 may receive a roadside assistance service request. In this step 705, the roadside assistance service provider system 600 may receive a service request from a customer with a distressed vehicle. The service request may be in the form of an online form, via a mobile device 215, etc. In this step 705, the customer with the distressed vehicle may select one of the various roadside assistance services provided by the roadside assistance service provider system 600. For example, the roadside assistance services may include, but not be limited to flat tire assistance, towing services, fuel services, automobile repairs, oil changes, scheduled maintenance appointments, etc.

Prior to this step, the roadside assistance service provider system 600 may receive a registration from a roadside assistance service provider. A roadside assistance service provider may register as a possible roadside assistance service provider for a given roadside assistance service. The roadside assistance service provider may list or check the various roadside assistance services that the roadside assistance service provider can perform and assist with. The roadside assistance service provider may register via the mobile service provider application 602 on a mobile device 215, such as a cell phone, a smart phone, or a tablet/laptop computer to register. The service provider may also register via an internet form, an iOS form, a social media platform (Facebook, twitter, google, etc.). The registration may be via conventional means such as through a targeted offer or mailing sent in an email or letter.

Additionally, prior to this step, the customer or distressed vehicle may register for the mobile service provider application 602 on a mobile device 215, such as a cell phone, a smart phone, or a tablet/laptop computer to register. The customer or distressed vehicle may register via an internet form, an iOS form, a social media platform (Facebook, twitter, google, etc.). The registration may be via conventional means such as through a targeted offer or mailing sent in an email or letter.

Furthermore, the roadside assistance service provider system 600 may validate or qualify a customer or distressed vehicle or the roadside assistance service provider using the insurance information. For example, the roadside assistance service provider system 600 may qualify, validate, or verify the customer or distressed vehicle or the roadside assistance service provider utilizing the insurance information 665 as described and provided by the insurance server 660, such as safe driver information or current payment information. This qualification, validation, and/or verification may provide a pre-screening tool of the customer or distressed vehicle or the roadside assistance service provider.

In step 710, the roadside assistance service provider system 600 may verify the roadside assistance service request utilizing various criteria. For example, in step 710 the roadside assistance service provider system 600 may verify that the job or task is not currently assigned. The roadside assistance service provider system 600 may also verify that the roadside assistance service provider is not enrolled in auto-assignment. The roadside assistance service provider system 600 may also verify the roadside assistance service providers that are logged-in and available. Any driver or roadside assistance service provider logged into the roadside assistance service provider system 600 may be considered in the list of roadside assistance service providers for a given job or task.

In step 715, the roadside assistance service provider system 600 may compare existing workload, timelines, and distance for each roadside assistance service provider and requested roadside assistance service. In step 715, the roadside assistance service provider system 600 may utilize many factors, such as considering the current queue and the amount of time to complete tasks in the queue. The roadside assistance service provider system 600 may also consider and factor the skill levels required to complete a given task, for example a skill level 1 may use a factor of 2 for time estimates. The roadside assistance service provider system 600 may also consider and factor the skill level and whether a driver or roadside assistance service provider is allowed and/or capable of working on a specific job or task, utilizing it as a qualifier. The roadside assistance service provider system 600 may also consider and factor the price of the driver, any particular skills of the driver, the match with the user or customer, and the equipment of the driver. The roadside assistance service provider system 600 may also consider how long the driver will take at their current job, utilizing information from the collection module 610. The roadside assistance service provider system 600 may also consider weather, time of day, traffic, neighborhood, type of road, etc. which may cause the tasks onsite to take longer to perform. The roadside assistance service provider system 600 may also utilize driver performance as a factor in assignment of the next jobs and prioritize tasks at which a certain driver is strong. Other factors and/or considerations may be utilized for assigning roadside assistance service providers without departing from this invention.

Additionally, in this step 715, the telematics information of the roadside assistance service providers and the user may be sent from a telematics device 225 located in the vehicle or as part of the mobile device 215. The telematics information may include information regarding the user and/or the customer's distressed vehicle. The telematics information may also include information regarding the roadside assistance service provider and/or the roadside assistance service provider's vehicle. The telematics information may include information such as location, velocity (both instantaneous and/or average), direction of travel, route and final destination. This telematics information may then be utilized to assist in providing further information to the roadside assistance service provider system 600. Utilizing telematics information and/or insurance information (driving habits), the roadside assistance service provider system 600 may know the driving routes and the known locations of various roadside assistance service providers when the service request is made and may therefore match up given roadside assistance service providers who are located advantageously to the location that the roadside assistance services will be performed.

In step 720, the roadside assistance service provider system 600 may rank the roadside assistance service providers. The rankings may be based on time, then by distance if there is a tie, and then by on time performance if there is still a tie. The rankings may also be based on any of the factors utilized during step 715. Other rankings may be utilized for the roadside assistance service providers without departing from this invention.

Following the rankings, in step 725, the roadside assistance service provider system 600 may then send invitations and or assignments to the drivers or the roadside assistance service provider. If the driver accepts the invitation and assignment, the roadside assistance service provider system 600 may assign the roadside assistance service request to the driver. If the driver does not accept the invitation and assignment, the roadside assistance service provider system 600 may send the roadside assistance service request to the next driver or roadside assistance service provider on the list. Additionally, if there is no assignment after a given time frame (for example 10 minutes), then the roadside assistance service provider system 600 may send the roadside assistance service request back to a manual dispatcher for manual assignment.

In step 730, the roadside assistance service provider system 600 provides roadside assistance event notifications for the roadside assistance services provided. In step 730, the roadside assistance service provider system 600 may display and or provide feedback for various events and tasks during the roadside assistance services. In this step 730, the roadside assistance service provider system 600 may provide various service notifications from the service provider to the user. The roadside assistance service provider system 600 may provide the user with information regarding the status of the services, i.e. service confirmation, start time, service provider en-route, service provider onsite, service completed, and/or service canceled. Furthermore, in step 730, the roadside assistance service provider system 600, the feedback and display may provide near real-time cues to the tow truck driver's mobile device, such as alerting when the amount of time spent on a task exceeds a predefined threshold, flagging high priority tasks/assignments, providing a technical reference for the repair, etc., performance measurements, and award points/score to the tow truck driver.

According to some arrangements, the process described with respect to FIG. 7 may be provided by a mobile service provider application 602 or a service provider application executing on a device such as a service provider's mobile communication device 215 or service provider server 605, through the internet or on a webpage, or a service provider's vehicle computer or navigation system.

The steps that follow in FIG. 8 may be implemented by one or more of the components in FIGS. 1 through 3 and FIG. 6 and/or other components, including other computing devices. FIG. 8 illustrates an example process 800 by which a user may utilize a computer-implemented method and system and a roadside assistance service provider system 600. The roadside assistance service provider system 600 may include sensors on a tow truck or other similar vehicles (e.g. whether the flatbed is down, GPS location monitoring, etc.), smartphone user interfaces and historical statistics about roadside assistance services (e.g. the historical average time for changing a flat tire, for jumping a dead battery, etc.) that may be collected from the real world and stored in a data store, and analyzed using particular rules and/or formats. Particular roadside assistance service providers may be assigned to particular distressed vehicles/drivers based on one or more characteristics, including characteristics/rules. Other characteristics/criteria may include proximity in location, prior user ratings, equipment on the tow truck, skillset/expertise of the driver of the tow truck, price of the tow truck, etc. Additionally, the roadside assistance service provider system 600 may provide near real-time cues to the tow truck driver's mobile device, such as alerting when the amount of time spent on a task exceeds a predefined threshold, flagging high priority tasks/assignments, providing a technical reference for the repair, etc., and award points/score to the tow truck driver. The computer-implemented method and system may utilize insurance information to provide additional features and to enhance the mobile service provider methods and systems by providing known and safe routes and recommendations to the user as described and detailed below.

In step 805, the roadside assistance service provider system 600 may receive a roadside assistance service request. In this step 805, the roadside assistance service provider system 600 may receive a service request from a customer with a distressed vehicle. The service request may be in the form of an online form, via a mobile device 215, etc. In this step 805, the customer with the distressed vehicle may select one of the various roadside assistance services provided by the roadside assistance service provider system 600. For example, the roadside assistance services may include, but not be limited to flat tire assistance, towing services, fuel services, automobile repairs, oil changes, scheduled maintenance appointments, etc.

Prior to this step, the roadside assistance service provider system 600 may receive a registration from a roadside assistance service provider. A roadside assistance service provider may register as a possible roadside assistance service provider for a given roadside assistance service. The roadside assistance service provider may list or check the various roadside assistance services that the roadside assistance service provider can perform and assist with. The roadside assistance service provider may register via the mobile service provider application 602 on a mobile device 215, such as a cell phone, a smart phone, or a tablet/laptop computer to register. The service provider may also register via an internet form, an iOS form, a social media platform (Facebook, twitter, google, etc.). The registration may be via conventional means such as through a targeted offer or mailing sent in an email or letter.

Additionally, prior to this step, the customer or distressed vehicle may register for the mobile service provider application 602 on a mobile device 215, such as a cell phone, a smart phone, or a tablet/laptop computer to register. The customer or distressed vehicle may register via an internet form, an iOS form, a social media platform (Facebook, twitter, google, etc.). The registration may be via conventional means such as through a targeted offer or mailing sent in an email or letter.

Furthermore, the roadside assistance service provider system 600 may validate or qualify a customer or distressed vehicle or the roadside assistance service provider using the insurance information. For example, the roadside assistance service provider system 600 may qualify, validate, or verify the customer or distressed vehicle or the roadside assistance service provider utilizing the insurance information 665 as described and provided by the insurance server 660, such as safe driver information or current payment information. This qualification, validation, and/or verification may provide a pre-screening tool of the customer or distressed vehicle or the roadside assistance service provider.

In step 810, the roadside assistance service provider system 600 may verify the roadside assistance service request utilizing various criteria. For example, in step 810 the roadside assistance service provider system 600 may verify that the job or task is not currently assigned. The roadside assistance service provider system 600 may also verify that the roadside assistance service provider is not enrolled in auto-assignment. The roadside assistance service provider system 600 may also verify the roadside assistance service providers that are logged-in and available. Any driver or roadside assistance service provider logged into the roadside assistance service provider system 600 may be considered in the list of roadside assistance service providers for a given job or task.

In step 815, the roadside assistance service provider system 600 may compare existing workload, timelines, and distance for each roadside assistance service provider and requested roadside assistance service. In step 815, the roadside assistance service provider system 600 may utilize many factors, such as considering the current queue and the amount of time to complete tasks in the queue. The roadside assistance service provider system 600 may also consider and factor the skill levels required to complete a given task, for example a skill level 1 may use a factor of 2 for time estimates. The roadside assistance service provider system 600 may also consider and factor the skill level and whether a driver or roadside assistance service provider is allowed and/or capable of working on a specific job or task, utilizing it as a qualifier. The roadside assistance service provider system 600 may also consider and factor the price of the driver, any particular skills of the driver, the match with the user or customer, and the equipment of the driver. The roadside assistance service provider system 600 may also consider how long the driver will take at their current job, utilizing information from the collection module 610. The roadside assistance service provider system 600 may also consider weather, time of day, traffic, neighborhood, type of road, etc. which may cause the tasks onsite to take longer to perform. The roadside assistance service provider system 600 may also utilize driver performance as a factor in assignment of the next jobs and prioritize tasks at which a certain driver is strong. Other factors and/or considerations may be utilized for assigning roadside assistance service providers without departing from this invention.

Additionally, in this step 815, the telematics information of the roadside assistance service providers and the user may be sent from a telematics device 225 located in the vehicle or as part of the mobile device 215. The telematics information may include information regarding the user and/or the customer's distressed vehicle. The telematics information may also include information regarding the roadside assistance service provider and/or the roadside assistance service provider's vehicle. The telematics information may include information such as location, velocity (both instantaneous and/or average), direction of travel, route and final destination. This telematics information may then be utilized to assist in providing further information to the roadside assistance service provider system 600. Utilizing telematics information and/or insurance information (driving habits), the roadside assistance service provider system 600 may know the driving routes and the known locations of various roadside assistance service providers when the service request is made and may therefore match up given roadside assistance service providers who are located advantageously to the location that the roadside assistance services will be performed.

In step 820, the roadside assistance service provider system 600 may rank the roadside assistance service providers. The rankings may be based on time, then by distance if there is a tie, and then by on time performance if there is still a tie. The rankings may also be based on any of the factors utilized during step 715. Other rankings may be utilized for the roadside assistance service providers without departing from this invention.

Following the rankings, in step 825, the roadside assistance service provider system 600 may then send invitations and or assignments to the drivers or the roadside assistance service provider. If the driver accepts the invitation and assignment, the roadside assistance service provider system 600 may assign the roadside assistance service request to the driver. If the driver does not accept the invitation and assignment, the roadside assistance service provider system 600 may send the roadside assistance service request to the next driver or roadside assistance service provider on the list. Additionally, if there is no assignment after a given time frame (for example 10 minutes), then the roadside assistance service provider system 600 may send the roadside assistance service request back to a manual dispatcher for manual assignment.

In step 830, the roadside assistance service provider system 600 provides reassignment adjustments. In this step 830, roadside assistance service provider system 600 may shuffle the assignments during the middle of the assignment process. The roadside assistance service provider system 600 may shuffle current workloads as long as the driver or roadside assistance service provider is not yet at the roadside assistance site. Various situations may trigger the reassignment. The roadside assistance service provider system 600 may trigger a reassignment such as flagging of a roadside assistance service request as a priority roadside assistance service in which particular jobs may override other jobs and may be highlighted to dynamically reassign jobs. One example of this priority flagging reassignment may be a person stranded on a highway and needs attention immediately. Another example of this priority flagging reassignment may be a person or distressed vehicle stranded in a dangerous location and needing attention immediately. Another situation that may trigger a reassignment may be the shifting of work to other roadside assistance service providers in a particular roadside assistance service provider is moving slowly during a given day. In this instance, the roadside assistance service provider system 600 provides a centralized screen or output to show how different roadside assistance service providers are working and performing.

In step 835, the roadside assistance service provider system 600 provides roadside assistance event notifications for the roadside assistance services provided. In step 835, the roadside assistance service provider system 600 may display and or provide feedback for various events and tasks during the roadside assistance services. In this step 835, the roadside assistance service provider system 600 may provide various service notifications from the service provider to the user. The roadside assistance service provider system 600 may provide the user with information regarding the status of the services, i.e. service confirmation, start time, service provider en-route, service provider onsite, service completed, and/or service canceled. Furthermore, in step 835, the roadside assistance service provider system 600, the feedback and display may provide near real-time cues to the tow truck driver's mobile device, such as alerting when the amount of time spent on a task exceeds a predefined threshold, flagging high priority tasks/assignments, providing a technical reference for the repair, etc., performance measurements, and award points/score to the tow truck driver.

In step 840, the roadside assistance service provider system 600 provides rewards based on the roadside assistance service provided. In this step 840, the roadside assistance service provider system 600 may be configured to provide a reward to an individual driver or roadside assistance service provider or roadside assistance service provider company if particular times are met. For example, the reward may allow a driver to move up in a queue in a definitive way if the roadside assistance service provider beats the estimate time or suggested times. Additionally, the roadside assistance service provider system 600 may provide an individual driver or roadside assistance service provider an additional award if the job or tasks are done more quickly. The roadside assistance service provider system 600 may provide awards based on accurate estimates and not necessarily doing a job or task more quickly.

In step 845, the roadside assistance service provider system 600 provides performance feedback for the roadside assistance service provider. In this step 845, the roadside assistance service provider system 600 may also include a performance output or screen, which displays to the driver whether the driver is within their estimated time of arrival for meeting their roadside assistance service request. The roadside assistance service provider system 600 may also display or output to the driver whether the driver's performance meets average performance as well as the driver's past performance for the given tasks or roadside assistance services. The roadside assistance service provider system 600 may also calculate a performance score based on the given tasks or roadside assistance services. The roadside assistance service provider system 600 may output or display the driver's performance score that depends on the driver's ability to meet the timing of tasks as estimated or required. The roadside assistance service provider system 600 may also be able to identify a driver that performs weak at certain tasks for training the driver in those given tasks.

According to some arrangements, the process described with respect to FIG. 8 may be provided by a roadside assistance service provider system 600, a mobile service provider application 602, or a service provider application executing on a device such as a service provider's mobile communication device 215 or service provider server 605, through the internet or on a webpage, or a service provider's vehicle computer or navigation system.

Figure 9:
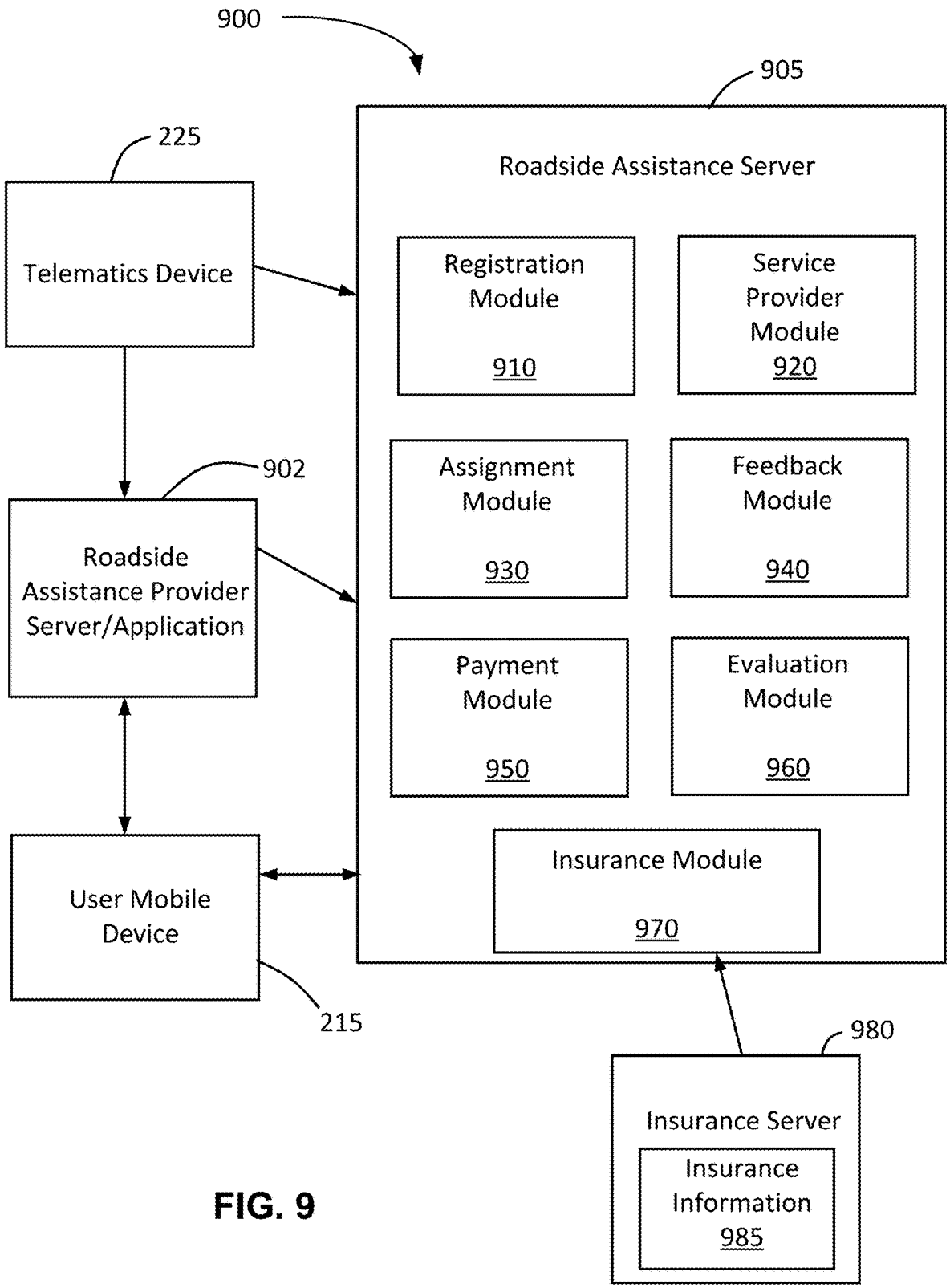
FIG. 9 illustrates an exemplary block diagram of a roadside assistance service provider system that may be used to implement various aspects of the disclosure.
Figure 10:
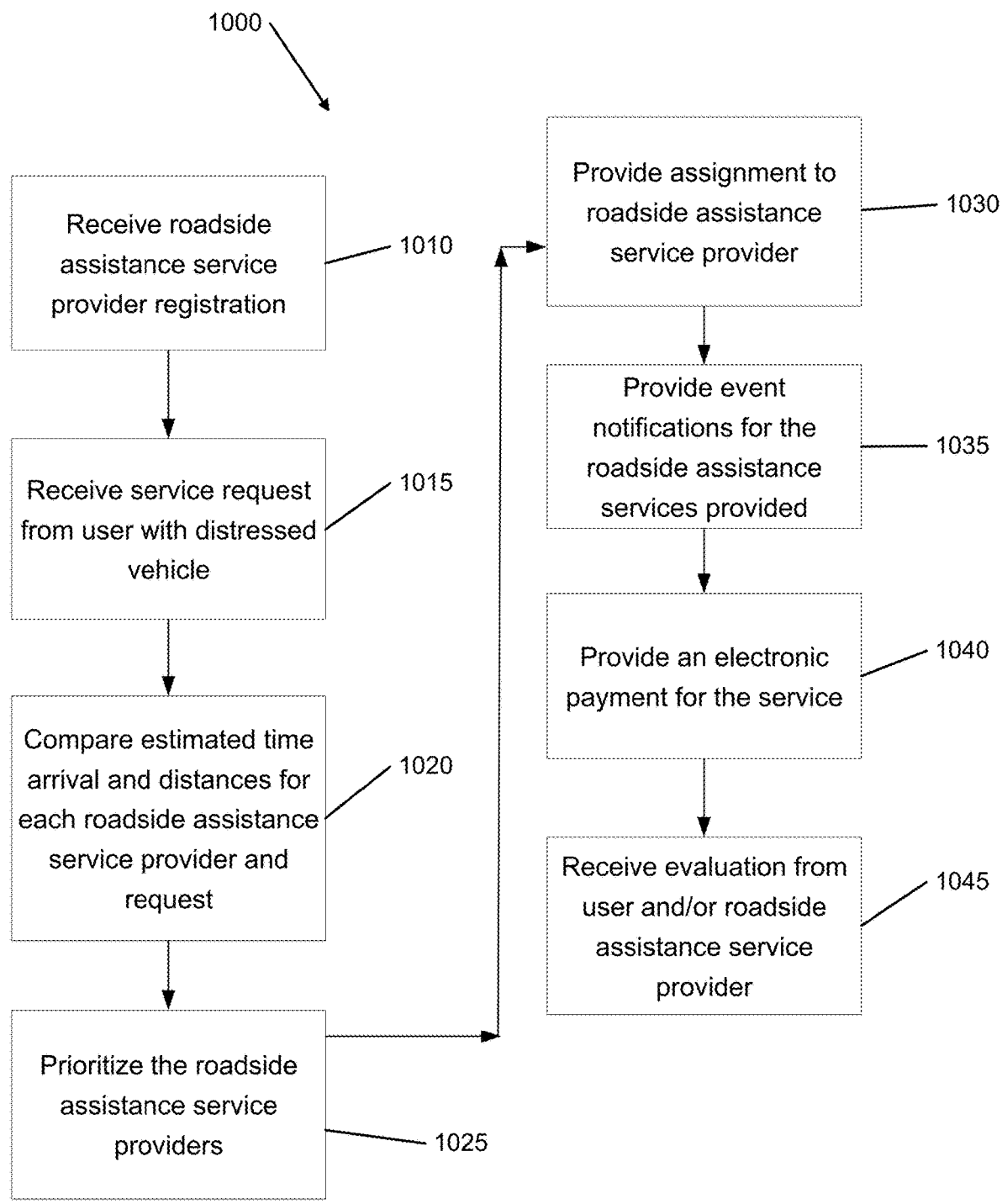
FIG. 10 illustrates a method of providing a roadside assistance service provider system in accordance with aspects of the disclosure.

In another embodiment in accordance with aspects of this invention, FIGS. 9 and 10 illustrate a crowdsourcing roadside assistance system or roadside assistance service provider system 900 that may be utilized for the assignment of roadside assistance service providers to users of distressed vehicles/drivers requiring roadside assistance. The roadside assistance service providers may be non-professional service providers or independent contractor service providers or other service providers. Crowdsourcing roadside assistance is an innovative way of organizing roadside assistance service providers and users with distressed vehicles. The collaborative group enables hundreds or even thousands of roadside assistance service providers to provide roadside assistance to a variety of different users with distressed vehicles. The crowdsourcing may use an Internet task market to connect roadside assistance service providers to users with distressed vehicles. The roadside assistance crowdsourcing enables those roadside assistance service providers to take the kinds of jobs that they like and to complete those jobs when and where they want. Users with distressed vehicles can find the kinds of roadside assistance service providers the user needs, with the specific skills for their jobs, and pay for only the amount of work the user needs. The roadside assistance service provider system 900 is a system that provides roadside service requests to service providers who have agreed they can handle and cover roadside assistance service through the crowdsourced providing of roadside assistance services. The service providers may be service providers who may or may not be independent contractors. The services may be related to roadside issues such as jump starting battery, unlocking a car, changing tire(s), towing the distressed vehicle, lack of fuel, etc. It is understood to one skilled in the art that the embodiments described and disclosed above and in FIGS. 1-8 may be used together with these embodiments illustrated in FIGS. 9 and 10 and described below.

Generally, the roadside assistance service provider system 900 may include one or more of the following: a registration module 910, a service provider module 920, and an assignment module 930. In the registration module 910, a roadside assistance service provider may register to become available in the roadside assistance service provider system 900. The roadside assistance service provider may require validation and certification to become registered in the roadside assistance service provider system 900. In the assignment module 930, particular roadside assistance service providers may be assigned to particular distressed vehicles/drivers based on one or more characteristics, including characteristics/rules from the service provider module 920. For example, the assignment module 930 may match/assign a service provider that is capable of unlocking a car with a user who needs assistance with a lock-out situation. Other characteristics/criteria utilized by the assignment module 930 may include estimated time of arrival, proximity in location, prior user ratings, available equipment, skillset/expertise of the service provider, or price/cost of the service provider, etc. The service provider module 920 may provide near real-time cues to the service provider's mobile device, such as alerting when the amount of time spent on a task exceeds a predefined threshold, flagging high priority tasks/assignments, providing a technical reference for the repair, etc., and award points/score to the service provider.

FIG. 9 is an example block diagram of the roadside assistance service provider system 900 and a roadside assistance server 905. The roadside assistance server 905 may include a variety of software or firmware modules such as one or more of the following: a registration module 910, a service provider module 920, an assignment module 930, a feedback module 940, a payment module 950, an evaluation module 960, and an insurance module 970. Each of these modules may be utilized by the roadside assistance server 905.

The registration module 910 may be configured to facilitate the registration of the roadside assistance service provider. During registration, a roadside assistance provider application 902 may be available on a mobile device to a new roadside assistance service provider. The roadside assistance service provider may download this roadside assistance provider application 902 on to a mobile device 215. Alternatively, the roadside assistance service provider may utilize the roadside assistance provider application 902 via the internet on an internet form or a website. The potential roadside assistance service provider may then complete a profile and enter their information, such as name, address, phone number, services potentially needed, and any other qualifications necessary or linked to the services. The potential roadside assistance service provider may also be able to register using the insurance information which includes all of the pertinent and required information. The profile may then be saved to the roadside assistance service provider system 900. The roadside assistance service provider may allow the system 900 to know or track their locations at all times to help facilitate the matching of users and roadside assistance service providers. Additionally, the insurance information 985, GPS information through the roadside assistance provider application 902 on the mobile device 215, and/or telematics information from the telematics device 225 may allow the roadside assistance service provider system 900 to link the location to the users and the roadside assistance service providers through the telematics device 225 or mobile device 215 with the GPS information.

The potential roadside assistance service provider may then be qualified, validated, or verified. This qualification, validation, and/or verification may provide a pre-screening tool for the users to ensure a quality and safe service provider. The potential roadside assistance service provider may be required to demonstrate technical and customer service skills in roadside assistance. The potential roadside assistance service provider may have an audition or certification to show that the service provider can engage in the required roadside assistance skills. The potential roadside assistance service provider may be required to complete background check and/or a motor vehicle check. The roadside assistance service provider system 900 may qualify, validate, or verify the roadside assistance service provider using the insurance information 985 as described and provided by the insurance server 980, such as safe driver information or current payment information. The insurance information 985 may be utilized in the background check (such as has the person been in accidents, is the person a high-risk driver, or other insurance information 985 which may be risk indicators). The potential roadside assistance service provider may be given a tool kit to complete the required roadside assistance services or the potential roadside assistance service provider may have their own tool kit.

The service provider module 920 may be configured to do one or more of the following: view service request, provide confirmation for the service request, and send event notifications (service start, en route, onsite, service complete, canceled service). The service provider module 920 may allow and provide the service provider to view and accept a service request. The service provider module 920 may also allow and provide the service provider the ability to send event notifications for various service events. For example, the service provider module 920 may send an event notification confirming the service request. The service provider module 920 may also send an event notification for the start and completion of the service request. The service provider module 920 may also send an event notification for other events such as the service provider is en route, the service provider is onsite, or the service provider has canceled the service request.

Additionally, the service provider module 920 may be configured to provide details of a given service provider, such as location, services provided, service provider ratings, service provider reviews, etc. Additionally, the service provider module 920 may be configured to provide real-time information about a given service provider, such as estimated time of arrival, wait time, service time, service availability, etc. The service provider module 920 may be in communication with the roadside assistance provider server/application 902, specifically for the real-time service provider information. Accordingly, a user may be able to receive immediate information about a given service provider through the service provider module 920.

The service provider module 920 may also verify the roadside assistance service providers that are logged-in and available. Any roadside assistance service provider logged into the roadside assistance service provider system 900 may be considered in the list of roadside assistance service providers for a given job or task.

The service provider module 920 may also receive a registration by the roadside assistance service provider from the registration module 910. The registration may be via a mobile application, a web component, an internet form, an iOS form, a social media platform (Facebook, twitter, google, etc.). The registration may be via conventional means such as through a targeted offer or mailing sent in an email or letter.

Generally, the assignment module 930 may automatically assign particular roadside assistance service providers to particular distressed vehicles/drivers based on one or more characteristics, including characteristics/rules. The assignment module 930 may be configured to do one or more of the following: determine the distance and estimate time to arrive for each available roadside assistance service provider; compare existing workload, timelines, and distance for each roadside assistance service provider and requested service; and provide assignments and invitations to the roadside assistance service providers. In another embodiment, a dispatcher may assign and select a particular roadside assistance service providers to particular distressed vehicles/drivers based on one or more characteristics, including characteristics/rules.

The assignment module 930 may determine the distance and estimated time to arrive for each available roadside assistance service provider. Additionally, the assignment module 930 may compare the existing workload, timelines, and distances for each of the various roadside assistance service providers and the requested service. The assignment module 930 may utilize many factors, such as considering the current queue and the amount of time to complete tasks in the queue. The assignment module 930 may also consider and factor the skill level and whether a roadside assistance service provider is allowed and/or capable of working on a specific job or task, utilizing it as a qualifier. The assignment module 930 may also consider and factor the price of the driver, any particular skills of the driver, the match with the user or customer, and the equipment of the roadside assistance service provider. The assignment module 930 may also consider and factor the safest route between roadside assistance service provider and the distressed vehicle. The assignment module 930 may also consider and factor which roadside assistance service provider accepts the assignment/job first. The assignment module 930 may also consider and factor the roadside assistance service provider's acceptance rate in comparison to a market average. The assignment module 930 may also consider how long the roadside assistance service provider will take at their current job. The assignment module 930 may also consider weather, time of day, traffic, neighborhood, type of road, etc. which may cause the tasks onsite to take longer to perform. The assignment module 930 may also utilize roadside assistance service provider performance as a factor in assignment of the next jobs and prioritize tasks at which a certain roadside assistance service provider is strong. Other factors and/or considerations may be utilized for assigning roadside assistance service providers without departing from this invention.

Additionally, the assignment module 930 may determine and select a roadside assistance service provider. The determination may be based on estimated time of arrival (taking into account distance, route, and traffic). The roadside assistance service provider's on time performance may also be utilized with the determination. Other factors, as discussed above, may be utilized for the roadside assistance service providers without departing from this invention. Following the determination, the assignment module 930 may then send the assignment to the roadside assistance service provider. If the roadside assistance service provider accepts the assignment, the assignment module 930 may assign the roadside assistance service request to the roadside assistance service provider. If the roadside assistance service provider does not accept the assignment, the assignment module 930 may send the roadside assistance service request to the next roadside assistance service provider. Additionally, if there is no assignment after a given time frame (for example 10 minutes), then the assignment module 930 may send the roadside assistance service request back to a manual dispatcher for manual assignment.

The assignment module 930 may allow and facilitate the user requesting services. The requested services may include but not be limited to one or more of the following jobs or tasks: jump start automobile, flat tire change, running out of gas, tow the distressed vehicle, locked out of car, etc. The assignment module 930 may also collect information to verify every new roadside assistance service request to ensure the request meets particular criteria. For example, the assignment module 930 may verify that the roadside assistance service request or task is not currently assigned.

Generally, the feedback module 940 may provide near real-time cues to the roadside assistance service provider's mobile device, such as alerting when the amount of time spent on a task exceeds a predefined threshold, flagging high priority tasks/assignments, providing a technical reference for the repair, etc., and award points/score to the roadside assistance service provider. The feedback module 940 may be configured to do one or more of the following: provide roadside assistance event notifications for the services provided, provide rewards based on the roadside assistance service provided, and provide performance feedback for roadside assistance service providers. The feedback module 940 may provide feedback through a display.

As the roadside assistance service providers are progressing through a job or a roadside assistance service request, the feedback module 940 may provide status updates of the progress. The roadside assistance service provider may also update their status through the feedback module 940. The feedback module 940 may utilize GPS information through the roadside assistance provider application 902 on the mobile device 215 or telematics information to update and provide the notification of an updated status. A reminder or status update may pop-up as a visual indicator. The feedback module 940 may provide a reminder to tell the roadside assistance service provider when the roadside assistance service provider has gone beyond the average time for a particular task, and this task may be listed in red to signify that the roadside assistance service provider is over the time. The feedback module 940 may also display a list of the tasks and the average time for each task. The roadside assistance service provider may see these events or tasks in sequence. Additionally, the feedback module 940 may display or report that the roadside assistance service provider is over or under a given time.

The feedback module 940 may also include a performance output or screen, which displays to the roadside assistance service provider whether the roadside assistance service provider is within their estimated time of arrival for meeting their roadside assistance service request. The feedback module 940 may also display or output to the roadside assistance service provider whether the roadside assistance service provider's performance meets average performance as well as the roadside assistance service provider's past performance for the given tasks or roadside assistance services. The feedback module 940 may also calculate a performance score based on the given tasks or roadside assistance services. The feedback module 940 may output or display the roadside assistance service provider's performance score that depends on the roadside assistance service provider's ability to meet the timing of tasks as estimated or required. The feedback module 940 may also be able to identify a roadside assistance service provider that performs weak at certain tasks for training and further validation for the roadside assistance service provider in those given tasks.

The feedback module 940 may provide an service provider or a user the ability to receive immediate information about a given roadside assistance service provider through the roadside assistance service feedback module 940. The feedback module 940 may also facilitate and allow the user to monitor the service provider's real-time location movement via mapping services, geo-fencing, GPS information, and/or the telematics information from the telematics device 225. The feedback module 940 may also facilitate and allow the user to monitor the service provider's progress of completing the service.

The electronic payment module 950 may be configured to allow for and provide an electronic payment for the services rendered. The electronic payment module 950 may be configured to allow for the electronic payment to be automatic with a pre-entered payment method, such as credit card information, bank information, PayPal, google wallet, etc. With the automatic electronic payment method, the electronic payment module 950 will automatically send the payment information to the roadside assistance provider server/application 902 after an order has been placed. Additionally, the electronic payment module 950 may be configured to allow for manual individual input of payment methods with each service provider. In the manual electronic payment method, a service request may not be complete until the user manually inputs payment information to pay for the services. Additionally, the electronic payment module 950 may be configured to provide a yearly membership for the services, whereas the customer does not pay for each individual service request. Additionally, the electronic payment module 950 may be configured to allow for payment for services through a dispatch system. Additionally and alternatively, the electronic payment module 950 may be configured to allow for payment for services through the roadside assistance provider application 902 on the mobile device 215.

The evaluation module 960 may be configured to allow and provide evaluations, ratings, and comments for the users and the service providers. The evaluation module 960 may provide the user with the ability to submit an evaluation/feedback of the service provider. Additionally and alternatively, the evaluation module 960 may be configured to allow for evaluation/feedback of the service provider through the roadside assistance provider application 902 on the mobile device 215. The evaluation module 960 may also provide the service provider with the ability to submit evaluation/feedback of the user. The evaluation module 960 may include a simple form to rate the service provider and/or the user. The evaluation module 960 may utilize ratings such at excellent, very good, good, or poor. A numerical rating system may be utilized as well, such as a ranking from 1 to 5 or 1 to 10. The evaluation module 960 may also provide a comments section for the user or service provider to leave for the given service request. The evaluation module 960 may also consolidate, record, and present the various ratings for each service provider and user such that the service providers and users can view this data and use this data in order to make future decisions with providing services.

Additionally, an insurance module 970 may be included with the roadside assistance server 905. The insurance module 970 may include insurance information 985 that may reside on an insurance server 980 regarding information about a particular user, previous accidents, previous claims, information about other users with similar characteristics, etc. The insurance module 970 may also include insurance information 985 that may reside on an insurance server 980 regarding information about a particular roadside assistance service provider, previous accidents, previous claims, driving history, any other pertinent information about the roadside assistance service provider, and information about other roadside assistance service providers with similar characteristics, etc. Additionally, the insurance module 970 may work together with the assignment module 930 to utilize the insurance information 985 and specifically the knowledge and information of previous accidents, insurance claims, and driving history to assist in selecting the best known routes or service providers for the user. Additionally, the insurance module 970 may work together with the assignment module 930 to utilize the insurance information 985 known about a particular user or service provider and the insurance information 985 about users or service providers with similar characteristics to provide a prioritized rank and/or recommendations regarding known routes and service providers utilized.

The steps that follow in FIG. 10 may be implemented by one or more of the components in FIGS. 1 through 3 and FIG. 9 and/or other components, including other computing devices. FIG. 10 illustrates an example process 1000 by which a user may utilize a computer-implemented method and system and a roadside assistance service provider system 900. The roadside assistance service provider system 900 may include sensors on a vehicle (e.g. GPS location monitoring, etc.), smartphone user interfaces, smartphone GPS, and historical statistics about roadside assistance services (e.g. the historical average time for changing a flat tire, for jumping a dead battery, etc.) that may be collected from the real world and stored in a data store, and analyzed using particular rules and/or formats. Particular roadside assistance service providers may be assigned to particular distressed vehicles/drivers based on one or more characteristics, which may include one or more of the following: estimated time of arrival, proximity in location, prior user ratings, equipment, skillset/expertise of the roadside assistance service providers, price, etc. Additionally, the roadside assistance service provider system 900 may provide near real-time cues to the roadside assistance service provider's mobile device, such as alerting when the amount of time spent on a task exceeds a predefined threshold, flagging high priority tasks/assignments, providing a technical reference for the repair, etc., and award points/score to the roadside assistance service provider. The computer-implemented method and system may utilize insurance information to provide additional features and to enhance the mobile service provider methods and systems by providing known and safe routes and recommendations to the user as described and detailed below.

In step 1010, the roadside assistance service provider system 900 may receive a registration from a roadside assistance service provider. In this step 1010, a roadside assistance service provider may register as a possible service provider for a given roadside assistance service. The roadside assistance service provider may list or check the various services that the service provider can perform and assist. The roadside assistance service provider may register via the roadside assistance provider application 902 on a mobile device 215, such as a cell phone, a smart phone, or a tablet/laptop computer to register. The roadside assistance service provider may also register via an internet form, an iOS form, a social media platform (Facebook, twitter, google, etc.). The registration may be via conventional means such as through a targeted offer or mailing sent in an email or letter. Furthermore, the roadside assistance service provider system 900 may validate or qualify a service provider with a background check and/or a motor vehicle check. This qualification, validation, and/or verification may provide a pre-screening tool of the roadside assistance service providers thereby providing a pre-scanned service provider to the users. The roadside assistance service provider system 900 may also qualify, validate, or verify the service provider utilizing the insurance information 985 as described and provided by the insurance server 980, such as safe driver information or current payment information.

In step 1015, the roadside assistance service provider system 900 may receive a roadside assistance service request from the user. The roadside assistance service request may be in the form of an online form, via a mobile device 215, etc. In this step 1015, the user selects one of the various services provided by the roadside assistance service provider system 900. For example, the roadside services may include, but not be limited to flat tire assistance, jump-start services, lock-out services, and fuel services. Automobile services may also include automobile repairs, oil changes, scheduled maintenance appointments, etc.

In step 1020, the roadside assistance service provider system 900 may compare the estimated time of arrival for each roadside assistance service provider and requested roadside assistance service. The roadside assistance service provider system 900 may also compare the existing workload, timelines, and distance for each roadside assistance service provider and requested roadside assistance service. In step 1020, the roadside assistance service provider system 900 may utilize many factors, such as considering the current queue and the amount of time to complete tasks in the queue. The roadside assistance service provider system 900 may also consider and factor the skill levels required to complete a given task. The roadside assistance service provider system 900 may also consider and factor the skill level and whether a driver or roadside assistance service provider is allowed and/or capable of working on a specific job or task, utilizing it as a qualifier. The roadside assistance service provider system 900 may also consider and factor the price of the driver, any particular skills of the driver, the match with the user or customer, and the equipment of the driver. The roadside assistance service provider system 900 may also consider how long the roadside assistance service provider will take at their current job. The roadside assistance service provider system 900 may also consider weather, time of day, traffic, neighborhood, type of road, etc. which may cause the tasks onsite to take longer to perform. The roadside assistance service provider system 900 may also utilize the roadside assistance service provider performance as a factor in assignment of the next jobs and prioritize tasks at which a certain roadside assistance service provider is strong. Other factors and/or considerations may be utilized for assigning roadside assistance service providers without departing from this invention.

Additionally, in this step 1020, the GPS information of the roadside assistance service providers and the user may be sent from through the roadside assistance provider application 902 on the mobile device 215 located in the vehicle or as part of the mobile device 215. The GPS information through the roadside assistance provider application 902 on the mobile device 215 may include information regarding the user and/or the customer's distressed vehicle. The GPS information may also include information regarding the roadside assistance service providers and/or the roadside assistance service provider's vehicle. The GPS information may include information such as location, velocity (both instantaneous and/or average), direction of travel, route and final destination. This GPS information may then be utilized to assist in providing further information to the roadside assistance service provider system 900. Utilizing GPS information, telematics information, and/or insurance information (driving habits), the roadside assistance service provider system 900 may know the driving routes and the known locations of various roadside assistance service providers when the service request is made and may therefore match up given roadside assistance service providers who are located advantageously to the location that the roadside assistance services will be performed.

In step 1025, the roadside assistance service provider system 900 may prioritize the roadside assistance service providers and determine the best roadside assistance service providers. The prioritization may be based on estimated time of arrival, distance, or performance. The prioritization may also be based on any of the factors utilized during step 1020. Other rankings may be utilized for the roadside assistance service providers without departing from this invention.

Following the prioritization, in step 1030, the roadside assistance service provider system 900 may then send an assignment to the roadside assistance service provider. If the roadside assistance service provider accepts the assignment, the roadside assistance service provider system 900 may assign the roadside assistance service request to the roadside assistance service provider. If the roadside assistance service provider does not accept the assignment, the roadside assistance service provider system 900 may send the roadside assistance service request to the next roadside assistance service provider on the list. Additionally, if there is no assignment after a given time frame (for example 10 minutes), then the roadside assistance service provider system 900 may send the roadside assistance service request back to a manual dispatcher for manual assignment.

In step 1035, the roadside assistance service provider system 900 provides roadside assistance event notifications for the roadside assistance services provided. In step 1035, the roadside assistance service provider system 900 may display and or provide feedback for various events and tasks during the roadside assistance services. In this step 1035, the roadside assistance service provider system 900 may provide various service notifications from the roadside assistance service provider to the user. The roadside assistance service provider system 900 may provide the user with information regarding the status of the services, i.e. service confirmation, start time, service provider en-route, service provider onsite, service completed, and/or service canceled. Furthermore, in step 1035, the roadside assistance service provider system 900, the feedback and display may provide near real-time cues to the roadside assistance service provider's mobile device, such as alerting when the amount of time spent on a task exceeds a predefined threshold, flagging high priority tasks/assignments, providing a technical reference for the repair, etc., performance measurements, and award points/score to the roadside assistance service provider.

In step 1040, the roadside assistance service provider system 900 may provide an electronic payment for the services. In this step 1040, the roadside assistance service provider system 900 may also provide an electronic payment for the services to the roadside assistance server 905. The electronic payment may be made automatically to the roadside assistance server 905 and facilitated by the user entering their payment information into the roadside assistance provider server/application 902 during a set-up portion of the application. The electronic payment may also be made to the roadside assistance server 905 manually for an individual order by entering the payment information when the order is placed. Additionally, the electronic payment may also be made for a yearly membership for the services, whereas the customer does not pay for each individual service request.

In step 1045, the roadside assistance service provider system 900 may receive an evaluation from a user and/or a roadside assistance service provider. In this step 1045, the roadside assistance service provider system 900 may allow and provide evaluations, ratings, and comments for the users/roadside assistance service provider to complete on the service request. The roadside assistance service provider system 900 may provide the user/roadside assistance service provider with the ability to submit an evaluation/feedback of the service request. The evaluation may include a simple form to rate the service request. The evaluation may utilize ratings such at excellent, very good, good, or poor. The evaluation may also utilize a numerical rating system, such as a ranking from 1 to 5 or 1 to 10. The evaluation may also provide a comments section for the user/roadside assistance service provider to leave for the given service request. The roadside assistance service provider system 900 may save, consolidate, and record the evaluation reports for the various ratings for each user/roadside assistance service provider such that future users and roadside assistance service providers can view this data and use this data in order to make future decisions with future service requests.

According to some arrangements, the process described with respect to FIG. 10 may be provided by a roadside assistance provider application 902 executing on a device such as a service provider's mobile communication device 215 or roadside assistance server 905, through the internet or on a webpage, or a roadside assistance service provider's vehicle computer or navigation system.

The processes, systems and other features described herein may be applied to all types of services. For example, similar features and systems may be used to provide applications corresponding to automobile services, road services, home services, and personal services.

While the invention has been described with respect to specific examples and includes presently preferred modes of carrying out the invention, those skilled in the art will appreciate that there are numerous variations and permutations of the above described systems and techniques that fall within the spirit and scope of this disclosure.

We claim:

1. A roadside assistance system, the system comprising:
a roadside assistance service provider server having at least one processor;
a roadside assistance service provider application for use by a roadside assistance service provider on a mobile device and executing on the roadside assistance service provider server, wherein the roadside assistance service provider is from a crowdsourced group of individuals who are vehicle roadside assistance service providers, have registered with the roadside assistance system, and have been validated to provide roadside assistance services including one or more of the following services: vehicle jump start, vehicle flat tire change, vehicle fuel up, vehicle tow, or vehicle unlock;
a plurality of sensors in communication with the roadside assistance service provider application, wherein the plurality of sensors collects roadside assistance service provider information for the roadside assistance service provider;
an insurance server in communication with the roadside assistance service provider server and the roadside assistance service provider application, wherein the insurance server stores insurance information that includes information about the roadside assistance service provider, location and instances of previous accidents, and locations and instances of previous claims; and
a GPS on the mobile device of the roadside assistance service provider that acquires GPS information, the GPS in communication with the roadside assistance service provider application, wherein the GPS provides the GPS information to the roadside assistance service provider application and the roadside assistance service provider server;
wherein the roadside assistance service provider application upon execution of computer-executable instructions from the roadside assistance service provider server is configured to:
receive, by the roadside assistance service provider server, a roadside assistance service request from a driver of a distressed vehicle, wherein the roadside assistance service request includes one or more of the following: jump start the distressed vehicle, flat tire change for the distressed vehicle, fuel the distressed vehicle, tow the distressed vehicle, or unlock the distressed vehicle;
connect, by the roadside assistance service provider server, the roadside assistance service provider to the driver of the distressed vehicle using an Internet task market for crowdsourcing;
determine and factor, by the roadside assistance service provider server, an acceptance rate of the roadside assistance service provider as compared to a market average acceptance rate for roadside assistance service providers;
select, by the roadside assistance service provider server, the roadside assistance service provider based on the acceptance rate, the insurance information, and a proximity in location between the distressed vehicle and the roadside assistance service provider from the GPS information;
send, by the roadside assistance service provider server to the roadside assistance service provider application, the roadside assistance service request to the roadside assistance service provider;
receive, through the roadside assistance service provider application, acceptance of the roadside assistance service request from the roadside assistance service provider;
provide, by the roadside assistance service provider server and the GPS and plurality of sensors, real-time event notifications to the roadside assistance service provider application of a status of the roadside assistance service provider with respect to the roadside assistance service request, wherein the real-time event notifications are near real-time cues to the roadside assistance service provider via the mobile device based on the GPS information from the GPS in communication with the roadside assistance service provider application and the roadside assistance service provider information from the plurality of sensors in communication with the roadside assistance service provider application; and
receive, through the roadside assistance service provider application, confirmation of completion of the roadside assistance service request from the roadside assistance service provider.

2. The roadside assistance system of claim 1, wherein the real-time event notifications include one or more of the following: time until arrival, alerting when an amount of time spent on a task exceeds a predefined threshold, flagging high priority tasks, flagging high priority assignments.

3. The roadside assistance system of claim 1, wherein the GPS information includes location, velocity, route, and destination.

4. The roadside assistance system of claim 1, wherein the roadside assistance service provider information includes a location of the roadside assistance service provider, a type of the roadside assistance service provider, a set of ratings of the roadside assistance service provider, service provider skills, special equipment, and service provider certifications.

5. The roadside assistance system of claim 1, wherein the roadside assistance service provider information includes real-time information that includes one or more of the following: an availability of the roadside assistance service provider, a start time for the roadside assistance service provider, or a completion time for the roadside assistance service provider.

6. The roadside assistance system of claim 1, wherein the real-time event notification is provided on a display through the roadside assistance service provider application to the roadside assistance service provider.

7. The roadside assistance system of claim 1, wherein the plurality of sensors are positioned on a vehicle of the roadside assistance service provider.

8. The roadside assistance system of claim 1, wherein the roadside assistance service provider application upon execution of the computer-executable instructions from the roadside assistance service provider server is further configured to:
provide, by the roadside assistance service provider server and through the roadside assistance service provider application, electronic payment for completing the roadside assistance service request to the roadside assistance service provider.

9. The roadside assistance system of claim 8, wherein the electronic payment is automatic with a pre-entered payment method when the roadside assistance service request is complete.

10. The roadside assistance system of claim 1, wherein the roadside assistance service provider application upon execution of the computer-executable instructions from the roadside assistance service provider server is further configured to:
receive, by the roadside assistance service provider server, an evaluation from the driver of the distressed vehicle of the roadside assistance service provider after the roadside assistance service request is complete.

11. The roadside assistance system of claim 1, wherein the roadside assistance service provider application upon execution of the computer-executable instructions from the roadside assistance service provider server is further configured to:
receive, by the roadside assistance service provider server, an evaluation from the roadside assistance service provider of the driver of the distressed vehicle after the roadside assistance service request is complete.

12. The roadside assistance system of claim 1, wherein the roadside assistance service provider application upon execution of the computer-executable instructions from the roadside assistance service provider server is further configured to:
receive, by the roadside assistance service provider server, a registration from the roadside assistance service provider from the crowdsourced group of individuals who are vehicle roadside assistance service providers, wherein the registration includes background checks and a driver's record check.

13. The roadside assistance system of claim 12, wherein the registration further includes validation for the roadside assistance service provider from the crowdsourced group of individuals who are vehicle roadside assistance service providers.

14. The roadside assistance system of claim 1, wherein the roadside assistance service provider is an independent contractor.

15. The roadside assistance system of claim 1, wherein the roadside assistance service provider includes a roadside assistance certification confirming that the roadside assistance service provider can complete the roadside assistance service request.

16. The roadside assistance system of claim 1, wherein the roadside assistance service provider application upon execution of the computer-executable instructions from the roadside assistance service provider server is further configured to:
complete, by the roadside assistance service provider server and through the roadside assistance service provider application, a background check for the roadside assistance service provider.

17. One or more non-transitory computer readable media storing computer readable instructions that, when executed, cause an apparatus to:
(a) receive, through a roadside assistance service provider application for use by a roadside assistance service provider on a mobile device executing on a roadside assistance service provider server having at least one processor, a roadside assistance service request from a driver of a distressed vehicle, wherein the roadside assistance service provider is from a crowdsourced group of individuals who are vehicle roadside assistance service providers, have registered with the roadside assistance service provider server, and have been validated to provide roadside assistance service including one or more of the following services: vehicle jump start, vehicle flat tire change, vehicle fuel up, vehicle tow, or vehicle unlock;

(b) collect roadside assistance service provider information by a plurality of sensors in communication with the roadside assistance service provider application and a vehicle of the roadside assistance service provider;

(c) receive, by the roadside assistance service provider server, insurance information from an insurance server, wherein the insurance information includes information about a particular roadside assistance service provider, location and instances of previous accidents, and locations and instances of previous claims, wherein the insurance server is connected to the roadside assistance service provider application and the insurance server communicates with the roadside assistance service provider application and transfers the insurance information;

(d) receive, by the roadside assistance service provider server, GPS information from a GPS on the mobile device of the roadside assistance service provider that acquires the GPS information;

(e) receive, by the roadside assistance service provider server, a roadside assistance service request from the driver of the distressed vehicle, wherein the roadside assistance service request includes one or more of the following: jump start the distressed vehicle, flat tire change for the distressed vehicle, fuel the distressed vehicle, tow the distressed vehicle, or unlock the distressed vehicle;

(f) connect, by the roadside assistance service provider server, the roadside assistance service provider to the driver of the distressed vehicle using an Internet task market for crowdsourcing;

(g) determine, by the roadside assistance service provider server, an acceptance rate of the roadside assistance service provider as compared to a market average acceptance rate for roadside assistance service providers;

(h) select, by the roadside assistance service provider server, the roadside assistance service provider based on the GPS information from the GPS in communication with the roadside assistance service provider application and the roadside assistance service provider information from the plurality of sensors in communication with the roadside assistance service provider application using a set of factors that include: proximity in location between the distressed vehicle and the roadside assistance service provider, prior driver's ratings for the roadside assistance service provider, a skill set of the roadside assistance service provider, the insurance information, the acceptance rate, and a cost of the roadside assistance service provider;

(i) send, by the roadside assistance service provider server to the roadside assistance service provider application, the roadside assistance service request to the roadside assistance service provider;

(j) receive, through the roadside assistance service provider application, acceptance of the roadside assistance service request from the roadside assistance service provider;

(k) provide, by the roadside assistance service provider server and the GPS and the plurality of sensors, real-time event notifications to the roadside assistance service provider application of a status of the roadside assistance service provider with respect to the roadside assistance service request based on the GPS information from the GPS in communication with the roadside assistance service provider application and the roadside assistance service provider information from the plurality of sensors in communication with the roadside assistance service provider application; and (l) receive, through the roadside assistance service provider application, confirmation of completion of the roadside assistance service request from the roadside assistance service provider.

18. The one or more non-transitory computer readable media storing computer readable instructions of claim 17, wherein the GPS information includes location, velocity, route, and destination.

19. The one or more non-transitory computer readable media storing computer readable instructions of claim 17, wherein the roadside assistance service provider information includes real-time information that includes one or more of the following: an availability of the roadside assistance service provider, a start time for the roadside assistance service provider, or a completion time for the roadside assistance service provider.

20. The one or more non-transitory computer readable media storing computer readable instructions of claim 17 that, when executed, cause an apparatus to further:
provide, by the roadside assistance service provider server and through the roadside assistance service provider application, electronic payment for completing the roadside assistance service request to the roadside assistance service provider, wherein the electronic payment is automatic with a pre-entered payment method when the roadside assistance service request is complete.

21. The one or more non-transitory computer readable media storing computer readable instructions of claim 17 that, when executed, cause an apparatus to further:
receive, by the roadside assistance service provider server, a registration from the roadside assistance service provider from the crowdsourced group of individuals who are vehicle roadside assistance service providers, wherein the registration includes background checks and a driver's record check, wherein the registration further includes validation for the roadside assistance service provider from the crowdsourced group of individuals who are vehicle roadside assistance service providers.

22. A roadside assistance system, the system comprising:
a roadside assistance service provider server having at least one processor;
a roadside assistance service provider application for use by a roadside assistance service provider on a mobile device and executing on the roadside assistance service provider server, wherein the roadside assistance service provider is from a crowdsourced group of individuals who are vehicle roadside assistance service providers, have registered with the roadside assistance system, and have been validated to provide roadside assistance services including the following services: vehicle jump start, vehicle flat tire change, vehicle fuel up, vehicle tow, and vehicle unlock a locked-out vehicle;
a plurality of sensors in communication with the roadside assistance service provider application, wherein the plurality of sensors collects roadside assistance service provider information for the roadside assistance service provider;
an insurance server in communication with the roadside assistance service provider server and the roadside assistance service provider application, wherein the insurance server stores insurance information that includes information about the roadside assistance service provider, location and instances of previous accidents, and locations and instances of previous claims; and
a GPS on the mobile device of the roadside assistance service provider that acquires GPS information, the GPS in communication with the roadside assistance service provider application, wherein the GPS provides the GPS information to the roadside assistance service provider application and the roadside assistance service provider server;
wherein the roadside assistance service provider application upon execution of computer-executable instructions from the roadside assistance service provider server is configured to:
receive, by the roadside assistance service provider server, a registration from the roadside assistance service provider from the crowdsourced group of individuals who are vehicle roadside assistance service providers, wherein the registration includes background checks and a driver's record check, wherein the registration further includes validation for the roadside assistance service provider from the crowdsourced group of individuals who are vehicle roadside assistance service providers;
receive, by the roadside assistance service provider server, a roadside assistance service request from a driver of a distressed vehicle, wherein the roadside assistance service request includes one or more of the following: jump start the distressed vehicle, flat tire change for the distressed vehicle, fuel the distressed vehicle, tow the distressed vehicle, or unlock the distressed vehicle;
connect, by the roadside assistance service provider server, the roadside assistance service provider to the driver of the distressed vehicle using an Internet task market for crowdsourcing;
determine, by the roadside assistance service provider server, an acceptance rate of the roadside assistance service provider as compared to a market average acceptance rate for roadside assistance service providers;
select, by the roadside assistance service provider server, the roadside assistance service provider based on the GPS information from the GPS in communication with the roadside assistance service provider application and the roadside assistance service provider information from the plurality of sensors in communication with the roadside assistance service provider application using one or more factors, wherein the one or more factors include one or more of the following: proximity in location between the distressed vehicle and the roadside assistance service provider, prior driver's ratings for the roadside assistance service provider, a skill set of the roadside assistance service provider, the acceptance rate, the insurance information, or a cost of the roadside assistance service provider;
send, by the roadside assistance service provider server to the roadside assistance service provider application, the roadside assistance service request to the roadside assistance service provider;
receive, through the roadside assistance service provider application, acceptance of the roadside assistance service request from the roadside assistance service provider;

provide, by the roadside assistance service provider server and the GPS and plurality of sensors, real-time event notifications to the roadside assistance service provider application of a status of the roadside assistance service provider with respect to the roadside assistance service request, wherein the real-time event notifications are near real-time cues to the roadside assistance service provider via the mobile device based on the GPS information from the GPS in communication with the roadside assistance service provider application and the roadside assistance service provider information from the plurality of sensors in communication with the roadside assistance service provider application; and receive, through the roadside assistance service provider application, confirmation of completion of the roadside assistance service request from the roadside assistance service provider.

23. The roadside assistance system of claim 22, wherein the roadside assistance service provider information includes real-time information that includes one or more of the following: an availability of the roadside assistance service provider, a start time for the roadside assistance service provider, or a completion time for the roadside assistance service provider.

24. The roadside assistance system of claim 22, wherein the roadside assistance service provider application upon execution of the computer-executable instructions from the roadside assistance service provider server is further configured to:

provide, by the roadside assistance service provider server and through the roadside assistance service provider application, electronic payment for completing the roadside assistance service request to the roadside assistance service provider, wherein the electronic payment is automatic with a pre-entered payment method when the roadside assistance service request is complete.

\* \* \* \* \*